United States Patent [19]
Lickiss et al.

[11] Patent Number: 6,104,798
[45] Date of Patent: Aug. 15, 2000

[54] ORDER PROCESSING AND REPORTING SYSTEM FOR TELECOMMUNICATIONS CARRIER SERVICES

[75] Inventors: Alan Lee Lickiss, Colorado Springs, Colo.; George Gregg Zollmann, Roswell, Ga.; Daniel Mark Hoyt, Manitou Springs, Colo.; Christian Attila Szabo, Atlanta, Ga.

[73] Assignee: MCI Communications Corporation, Washington, D.C.

[21] Appl. No.: 09/023,056

[22] Filed: Feb. 12, 1998

[51] Int. Cl.[7] ...................................................... H04M 3/42
[52] U.S. Cl. ................... 379/201; 379/93.12; 379/93.17; 379/207; 379/219
[58] Field of Search ................................. 379/201, 93.02, 379/93.03, 93.12, 93.17, 207, 219, 220, 229, 230

[56] References Cited

U.S. PATENT DOCUMENTS

| | | | |
|---|---|---|---|
| 5,416,833 | 5/1995 | Harper et al. | 379/265 |
| 5,491,742 | 2/1996 | Harper et al. | 379/265 |
| 5,528,677 | 6/1996 | Butler et al. | 379/201 |
| 5,619,562 | 4/1997 | Maurer et al. | 379/201 |
| 5,629,978 | 5/1997 | Blumhardt et al. | 379/207 |
| 5,644,619 | 7/1997 | Farris et al. | 379/309 |
| 5,687,224 | 11/1997 | Alley, Jr. et al. | 379/207 |
| 5,751,802 | 5/1998 | Carr et al. | 379/201 |
| 5,838,682 | 11/1998 | Dekelbaum et al. | 370/401 |
| 5,881,131 | 3/1999 | Farris et al. | 379/201 |
| 5,883,946 | 3/1999 | Beck et al. | 379/207 |
| 5,898,765 | 4/1999 | Teglovic et al. | 379/120 |
| 5,907,607 | 5/1999 | Waters et al. | 379/207 |
| 5,912,962 | 6/1999 | Bosco | 379/207 |
| 5,937,048 | 8/1999 | Pelle | 379/207 |

*Primary Examiner*—Harry S. Hong
*Assistant Examiner*—William J. Deane, Jr.

[57] ABSTRACT

An automated order processing system for a telecommunications services carrier is capable of activating customer orders and provisioning telecommunications services for customers. The system includes a client application including a graphical user interface for receiving one or more customer orders from a remote location, each customer order having at least one unique identifier, the client application further up-front validating the format of customer orders received. A server application is provided for entering the validated customer orders in a database storage device, prior to initiating customer order activation and provisioning. In addition to controlling the order entry, activation, provisioning and installation processes, the server application tracks the status of each customer order by receiving status information updates for each customer order throughout the entry, activation, provisioning and installation process, and accordingly updates the database storage device. The system additionally provides a report generating function providing customers with up to date information about their accounts via the client application's graphical user interface.

43 Claims, 20 Drawing Sheets

*480*

Ad Hoc Reports

To run an adhoc query, choose either WTN, MCD Status or TCSI from the first table and enter an appropriate value. Then, fill in either a date range or batch range. Note that only 1 criteria can be selected from each table.

Enter date information in the form MM/DD/YYYY.

| | |
|---|---|
| WTN | |
| MCD Status | |
| TCSI | |
| Date Range | — |
| Batch Range | — |

Submit Query

Name:
EMail Address:

| Report Name | Send | Don't Send |
|---|---|---|
| Batch Status | ● | ○ |
| Batch Summary | ● | ○ |
| Front End Rejects | ● | ○ |
| Outbound Disconnect | ● | ○ |
| Outbound Install | ● | ○ |
| Aged LEC Reject | ● | ○ |
| Pending BOC Action | ● | ○ |

Save Configuration

Current configuration listing. Report mailing is indicated by a "1".

| EMail Address | Batch Status | Batch Summary | Front End Rejects | Outbound Disconnect | Outbound Install | Aged LEC Reject | Pending BOC Action | Configure Date/Time |
|---|---|---|---|---|---|---|---|---|

FIG. 8D

| Fields | Descriptions |
|---|---|
| 506 BATCH | Batch number assigned by GUI |
| 508 CICCODE | Carrier CIC Code |
| 510 CORPID | Carrier RELI Corp ID |
| 502 SERVTYPE | Service Type = Type of order (PI, PA, MM) |
| 504 WTN | Working Telephone Number |
| BTN | Billing Telephone Number |
| CONVIND | Conversion Indicator ('blank' or 'N') |
| CUSTNAME | End User Name |
| ADDRESS1 | End User Address 1 |
| 514 ADDRESS2 | End User Address 2 |
| CITY | End User City |
| STATE | End User State |
| ZIP | End User ZIP code |
| LATAIND | LATA Indicator |
| 512 CUSTCODE | BTN + Cust Code = account number |
| CUSTTYPE | Customer Type (R=Residential, B=Business, X=Centrex) |
| 516 LOADATE | End User Letter of Authorization Date |
| 518 TERMID | Terminal ID |
| 520 CURDATE | Current Date |
| PICFEE | PIC Fee Waiver (Y=Carrier pays, blank=end user pays) |

| Fields | Descriptions |
|---|---|
| | 550 |
| WTN | Working Telephone Number |
| TERMINAL-ID | Terminal ID associated with the WTN to AP |
| LATA-IND | Jurisdictional Indicator = type of service |
| CORPORATE-ID | MCI ID assigned to the Carrier |
| EXPANDED-CIC-CODE | Carrier Identification Code |
| PROCESS-DATE | RELI processing date |
| TCSI | Transaction Code Status Indicator |
| TCSI DATE | Create date on the CARE record |
| TCSI-DESCRIPTION | Abbreviated description of TCSI |
| RELI-STATUS | Current RELI status code |
| RELI-STATUS-DATE | Date of most recent RELI status code |
| RELI-STATUS-DESC-SHORT | Short description of MCI status |
| RELI-STATUS-DESC-FULL | Full description of MCI status |
| BTN | Billing Telephone Number |
| BTN-CUSTOMER-CODE | Further identifies the BTN in the AP billing records |
| CUSTOMER-TYPE-IND | Customer Type (R=Residential, B=Business) |
| PUBLISHED-STATUS-IND | Identifies whether the WTN is unlisted |
| CUSTOMER-NAME1 | End User's Name Line 1 |
| CUSTOMER-NAME2 | End User's Name Line 2 |
| CUSTOMER-NAME3 | End User's Name Line 3 |
| CUSTOMER-ADDR1 | End User's Address Line 1 |
| CUSTOMER-ADDR2 | End User's Address Line 2 |
| CUSTOMER-ADDR3 | End User's Address Line 3 |
| CITY | End User's City |
| STATE | End User's State |
| ZIP-CODE | End User's Zip Code |
| OLD-WTN | Previously existing WTN (if WTN change) |
| OLD-TERMINAL-ID | Previously existing Term ID (if Term ID changed) |
| OLD-BTN | Previously existing BTN (if BTN changed) |
| OLD-BTN-CUSTOMER-CODE | Further identifies the old BTN in the billing records |
| LEC-ID | Identifies LEC (AP=Access Provider, AC=Access Customer) |
| PIC-CHANGE-FEE-FLAG | PIC Fee Waiver (Y=Carrier pays, blank=end user pays) |

555 groups: TCSI, TCSI DATE, TCSI-DESCRIPTION
560 groups: RELI-STATUS, RELI-STATUS-DATE, RELI-STATUS-DESC-SHORT, RELI-STATUS-DESC-FULL

FIG. 10 z, y, xxx

FIG. 11

| Field | Starting Position | Ending Position | Length | Value |
|---|---|---|---|---|
| Header Ind | 1 | 2 | 2 | HD |
| comma | 3 | 3 | 1 | , |
| Corp ID | 4 | 11 | 8 | |
| comma | 12 | 12 | 1 | , |
| Issue Date | 13 | 20 | 8 | |
| comma | 21 | 21 | 1 | , |
| Report Name | 22 | 46 | 25 | Front End Reject Report |
| comma | 47 | 47 | 1 | , |
| filler | 48 | 57 | 10 | |

| Field | Starting Position | Ending Position | Length | Value |
|---|---|---|---|---|
| Batch Number | 1 | 10 | 10 | |
| comma | 11 | 11 | 1 | , |
| WTN | 12 | 23 | 12 | |
| comma | 24 | 24 | 1 | , |
| Issue Date | 25 | 32 | 8 | |
| comma | 33 | 33 | 1 | , |
| Processed Date | 34 | 41 | 8 | |
| comma | 42 | 42 | 1 | , |
| MCD Status Code | 43 | 48 | 6 | |
| comma | 49 | 49 | 1 | , |
| OCIS Account | 50 | 57 | 8 | |

| Field | Starting Position | Ending Position | Length | Value |
|---|---|---|---|---|
| Trailer Ind | 1 | 2 | 2 | TR |
| comma | 3 | 3 | 1 | , |
| Total Record Count | 4 | 9 | 6 | |
| comma | 10 | 10 | 1 | , |

FIG. 12

| Field | Starting Position | Ending Position | Length | Value |
|---|---|---|---|---|
| Header Ind | 1 | 2 | 2 | HD |
| comma | 3 | 3 | 1 | , |
| Corp ID | 4 | 11 | 8 | |
| comma | 12 | 12 | 1 | , |
| Issue Date | 13 | 20 | 8 | |
| comma | 21 | 21 | 1 | , |
| Report Name | 22 | 51 | 30 | Batch Status Report, Outbound Disconnect Report, Outbound Install Report |
| comma | 52 | 52 | 1 | , |
| filler | 53 | 118 | 66 | spaces |

| Batch Number | 1 | 10 | 10 | |
|---|---|---|---|---|
| comma | 11 | 11 | 1 | , |
| WTN | 12 | 23 | 12 | |
| comma | 24 | 24 | 1 | , |
| Issued Date | 25 | 32 | 8 | |
| comma | 33 | 33 | 1 | , |
| MCD Status Date | 34 | 41 | 8 | |
| comma | 42 | 42 | 1 | , |
| MCD Status Code | 43 | 48 | 6 | |
| comma | 49 | 49 | 1 | , |
| MCD Status Desc | 50 | 109 | 60 | |
| comma | 110 | 110 | 1 | , |
| OCIS Account | 111 | 118 | 8 | |

| Trailer Ind | 1 | 2 | 2 | TR |
|---|---|---|---|---|
| comma | 3 | 3 | 1 | , |
| Total Record Count | 4 | 9 | 6 | |
| comma | 10 | 10 | 1 | , |
| filler | 11 | 118 | 108 | spaces |

FIG. 13

| | Field | Starting Position | Ending Position | Length | Value |
|---|---|---|---|---|---|
| 702 → | | | | | 700 ↓ |
| 704 | Header Ind | 1 | 2 | 2 | HD |
| 706 | comma | 3 | 3 | 1 | , |
| | Corp ID | 4 | 11 | 8 | |
| 708 | comma | 12 | 12 | 1 | , |
| | Issue Date | 13 | 20 | 8 | |
| 710 | comma | 21 | 21 | 1 | , |
| | Report Name | 22 | 47 | 26 | Batch Summary Report |

| | Field | Starting Position | Ending Position | Length | Value |
|---|---|---|---|---|---|
| 712 → | | | | | |
| 714 | Batch Number | 1 | 10 | 10 | |
| 716 | comma | 11 | 11 | 1 | , |
| | Received | 12 | 17 | 6 | |
| 718 | comma | 18 | 18 | 1 | , |
| | Pending | 19 | 23 | 5 | |
| 720 | comma | 24 | 24 | 1 | , |
| | Pending NOPS Install | 25 | 29 | 5 | |
| 722 | comma | 30 | 30 | 1 | , |
| | Active | 31 | 35 | 5 | |
| 724 | comma | 36 | 36 | 1 | , |
| | Front End Rejects | 37 | 41 | 5 | |
| 726 | comma | 42 | 42 | 1 | , |
| | Disconnected | 43 | 47 | 5 | |

| | Field | Starting Position | Ending Position | Length | Value |
|---|---|---|---|---|---|
| 732 → | | | | | |
| 734 | Trailer Ind | 1 | 2 | 2 | TR |
| 736 | comma | 3 | 3 | 1 | , |
| | Total Record | 4 | 9 | 6 | |

FIG. 14

| | Field | Starting Position | Ending Position | Length | Value |
|---|---|---|---|---|---|
| 750 → | | | | | |
| 752 | WTN | 1 | 10 | 10 | |
| 754 | comma | 11 | 11 | 1 | , |
| | Service Type | 12 | 13 | 2 | |
| 756 | comma | 14 | 14 | 1 | , |
| | Error Reason | 15 | 60 | 46 | |

| Field | Starting Position | Ending Position | Length | Value |
|---|---|---|---|---|
| OCIS Account | 1 | 7 | 8 | |
| comma | 8 | 8 | 1 | , |
| Corp ID | 9 | 16 | 8 | |
| comma | 17 | 17 | 1 | , |
| Service Type | 18 | 21 | 4 | |
| comma | 22 | 22 | 1 | , |
| Batch Number | 23 | 32 | 10 | |
| comma | 33 | 33 | 1 | , |
| MCD Service Type | 34 | 35 | 2 | |
| comma | 36 | 36 | 1 | , |
| MCI Conversion Ind | 37 | 37 | 1 | |
| comma | 38 | 38 | 1 | , |
| ANI | 39 | 48 | 10 | |
| comma | 49 | 49 | 1 | , |
| BTN | 50 | 59 | 10 | |
| comma | 60 | 60 | 1 | , |
| Orig ANI | 61 | 70 | 10 | ANI prior to npa split |
| comma | 71 | 71 | 1 | , |
| Orig BTN | 72 | 81 | 10 | BTN prior to npa split |
| comma | 82 | 82 | 1 | , |
| Range Privilege | 83 | 83 | 1 | |
| comma | 84 | 84 | 1 | , |
| MCD Status | 85 | 90 | 6 | |
| comma | 91 | 91 | 1 | , |
| MCD Status Date | 92 | 99 | 8 | |
| comma | 100 | 100 | 1 | , |
| Account Code Length | 101 | 105 | 5 | |

FIG. 16

(Inquire Message)

```
Request:
  SSN                       char[9+1]
  TABLE_COUNT               char[3+1]
  TABLE_DATA                array[50]
    TRANSACTION_TYPE        char[1+1]        // A or D
    CUSTOMER                char[8+1]
    ANI                     char[10+1]
    PIC_IND                 char[1+1]        // A-Intra E-Intra B-Both
```

FIG. 18A

(Install Message)

```
Request:
  OCIS_CUST_ID              char[8+1]
  OPER_SSN                  char[9+1]

ANI_CTR                   char[2+1]
  ANI_INFO                  array[50]
    PHONE_NBR               char[10+1]
    DIALIND                 char[1+1]
    MEGA_DIAL_SOURCE        char[4+1]
    LOA_DT                  char[6+1]
    LOA_IND                 char[1+1]
    BOC_STATUS              char[2+1]
    BOC_DT                  char[6+1]
    TAX_EXEMPT_CD           char[1+1]
    PREMISE_OWNER           char[1+1]
    ACCT_CODE               char[1+1]
    RATE_CODE               char[1+1]
    SUBTTL_IND              char[1+1]
    SUB56_IND               char[1+1]
    DEPT_NBR                char[4+1]
    PIC_ENV_FLAG            char[1+1]
```

FIG. 18B

(Deactivate Message)

```
Request:
  OPER_SSN                  char[9+1]
  CUST_NBR                  char[8+1]
  CTR                       char[2+1]
  ANI_INFO                  array[50]
    PHONE_NBR               char[10+1]
    STATUS_CODE             char[1+1]
    PIC_IND                 char[1+1]
```

FIG. 18C

ORDER PROCESSING AND REPORTING SYSTEM FOR TELECOMMUNICATIONS CARRIER SERVICES

FIELD OF THE INVENTION

The present invention relates generally to carrier services provided for customers of a telecommunications carrier entity, and particularly, an interactive, client-server based order processing and report generating system for carrier customers.

BACKGROUND OF THE INVENTION

In the telecommunications industry, primary or inter-exchange telecommunication services carrier, e.g., MCI Communications Corp., provide many services for customers. One type of service MCI provides includes the provision of long-distance communication or "carrier" services supporting communication of, e.g., audio (telephone) or data information, over their telecommunications networks. "Resellers", as known in the industry, refer to companies that resell the services of the primary telecommunication services carrier (MCI). There are generally two types of resellers, alternatively referred to herein as "carrier customers": 1) switchless resellers who sell telecommunications services to their customers and then use the networks of other carriers for all of their customers' traffic and, 2) facility-based resellers who are carriers having their own switch networks, yet use the primary telecommunications services carrier, e.g., MCI, to carry overflow traffic, as a backup network, or to extend carrier services beyond their limited geographical coverage.

The carrier customers of the inter-exchange carrier (e.g., MCI) are typically provided with a portfolio of services that include, inter alia, the entry and processing of orders for its carrier customers.

Generally, the entering and processing of carrier customer orders proceeds as follows: First, the carrier customer, or reseller, compiles a list of its new Automatic Number Identifiers "ANI" orders or, a list of ANIs for deactivation. The reseller submits these ANIs to the inter-exchange carrier (MCI) they intend to use to carry traffic for these ANIs and additionally submits the new ANI orders to the Local Exchange Carrier ("LEC") responsible for each ANI. These orders are also known as Preferred Interexchange Carrier ("PIC") orders, as they are used to implement a new PIC for each ANI at the LEC switch, a process which is known as LEC provisioning. The LEC then completes the PIC order by pointing the selected ANI to the Carrier Identification Code ("CIC") of the selected inter-exchange carrier. This is done at the LEC switch that serves the access line for that ANI. The LEC then sends a confirmation back to the reseller. Thus, when a long-distance call is originated from that ANI, the LEC switch will route the call to the selected inter-exchange carrier's network. The inter-exchange carrier will transport the call, but instead of billing the caller directly, the inter-exchange carrier bills the reseller. The reseller is responsible for billing the caller.

In an alternative embodiment, a reseller may perform its own LEC provisioning by supplying the LEC ith the reseller's customer's ANIs and the PIC for each ANI. However, the reseller must still submit ANI orders to their selected inter-exchange carrier, so that the inter-exchange carrier can update its systems to know how to bill calls for those ANIs.

Other processes, for example, deactivating a reseller's customer's ANI, are additionally performed using the same systems infrastructure.

Along with order entry and processing, the carrier must also provide order reporting for their reseller customers. For example, when the LEC returns a confirmation that a PIC order was completed, the inter-exchange carrier needs to report this status update to the reseller. The reseller also needs to know which ANI orders were not successfully completed.

The inter-exchange carrier MCI provides the order entry, processing, and reporting functions for its carrier customers via a Carrier Network Services ("CNS") system such as illustrated in the block diagram of FIG. 1.

Specifically, the prior art CNS system 10 illustrated in FIG. 1 contains the following functional elements:

An Order Service Center ("OSC") 20 for receiving the compiled list of the carrier customer's new ANI orders or, a list of ANIs for deactivation. Typically, these orders are shipped to the OSC 20 via E-mail, fax, NDM, or by mailing a diskette.

A Carrier Base 30 for receiving the list of orders through a GUI for immediate downloading to a server (not shown) for eventual storage in a database (not shown). The Carrier Base 30 performs a validating function, i.e., validates the ANIs against a Calling Area Database ("CADB") 35 which is an application on a mainframe computer which stores all valid ANIs in the North American Numbering Plan, along with the calling area and LEC for each ANI.

A Reseller Enhanced LEC Interface ("RELI") block 40 is also an application residing on a mainframe computer which receives a file of new orders, e.g.,via IBM's Network Data Mover ("NDM") over a WAN, and provides a systems interface between the inter-exchange carrier's systems infrastructure and that of an LEC, indicated as block 45 in FIG. 1. Orders for ANI activations and deactivations are sent to the LECs via the RELI system either by NDM or by other means such as by "QUICKPIC" which is a system described and claimed in co-pending U.S. patent application Ser. No. 08/923,872 entitled "System and Method for Real-Time Exchange of Customer Data Between Telecommunications Companies" and filed on Sep. 2, 1997, now issued to U.S. Pat No. 5,898,795 on Apr. 27, 1999 and assigned to the same assignee as the present invention, that provides a real-time interface between RELI and the LECS. The contents and disclosure of cop-ending U.S. patent application Ser. No. 08/923,872 now issued to U.S. Pat No. 5,898,795 on Apr. 27, 1999 and is incorporated by reference as if fully set forth herein.

An OCIS application block 50 which is an application residing on an IBM mainframe computer and functions as MCI's order entry system for all customer accounts. In OCIS, a reseller's new ANI is entered as a 10xxx ANI designating that the ANI is not subscribed to MCI for long-distance, but can reach MCI's network via the standard 10xxx dial-around method, or, in the case of reseller's ANIs, via a carrier identification code translation at the LEC. MCI's carrier customers (resellers) have their own and ANI install orders are routed to the LEC along with the reseller's CIC. The LEC must perform a translation from the reseller's CIC to MCI's CIC for each long-distance call, based on the ANI or access line, to ensure the call gets routed to MCI's network. Designating resellers ANIs as 10xxx ANIs in OCIS allows the reseller to own and manage their customer base.

In the architecture of FIG. 1, the Carrier Base server 30 has an IP messaging interface to the OCIS 50 which receives a front-end reject report, i.e., an IP message (over a WAN), for each ANI that cannot be validated against CADB or that fails field edits which are applied by the Carrier Base 30. In response, the OCIS application block 50 adds or cancels an ANI and responds to Carrier Base Server 30 with messages confirming which ANI orders were successfully completed and which ones were rejected. The RELI block 40 also creates an unmatched transaction file for ANIs which have not been installed in OCIS and sends to Carrier Base 30, e.g., via NDM, a daily file containing the status of all ANI orders. Besides acting as a front end to an OCIS application 50 and a RELI application 40, the Carrier Base 30 serves as a mid-range based server process and database for status information from OCIS 50 and RELI 40.

The Netcap functional block 60 is an MSV application residing on a mainframe computer which is an order entry system for enhanced calling features, e.g., features for Virtual Private Network ("VPN") calling plans. Features for VPN calling plans are manually entered into Netcap application 60 while customer account data, including ANIs, are automatically fed to the Netcap application 60 from OCIS 50. The preferred inter-exchange carrier, for example, typically provides a VPN service, e.g., MCI's "VNET", under which reseller services are managed and billed. Feature data, such as VPN routing translations and range privileges, are fed from Netcap block 60 to a Service Control Manager ("SCM") block 70 which distributes this data to a plurality of Data Access Points ("DAPs") indicated as elements 75 that perform call processing on VPN, 800/900 numbers, and other types of calls for network switches 85.

The Automatic ANI Download System ("AADS") block 80 receives ANIs for activation from OCIS block 60, and updates each of the switches in the carrier's network with newly received ANIs, so that the switches 85 can receive and process calls from these ANIs.

The current implementation of the prior art CNS system 10 has several limitations. First, a service agent in the OSC 20 must manually extract the customer's ANIs from the e-mail, fax, disk file, or whatever means is used, and enter these ANIs into the Carrier Base GUI 30. If an ANI fails a field edit, the customer is not made aware of this until after they have sent the ANI to the OCIS application 50.

Additionally, some of the PIC orders fail at the LEC and can not be provisioned. Additionally, incorrect or invalid ANI's are installed in the carrier's On-line Customer Information System 50.

Furthermore, reports provided by Carrier Base are limited in functionality as they have to be delivered via mail, e-mail, fax, or other non-real-time means. Thus, a failed ANI could not be reported until after the PIC order had been sent to the LEC and a confirmation was received back from the LEC.

It would be highly desirable to provide an order processing and reporting system for carrier customers that obviates the limitations of the prior art can be more efficiently validated, stored and tracked for subsequent remote customer access, and can be successfully installed at an LEC prior to LEC provisioning.

SUMMARY OF THE INVENTION

The present invention is a system and method for providing order processing and reporting services for the carrier customers, or resellers, of another telecommunications services carrier. Referred to as Carrier Direct ("CD"), the system includes a carrier-based Server application, a Client application which provides remote customer access to the CD Server, an Order Tracking Database, and interfaces to existing order entry and LEC interface systems. Resellers enter ANIs for their new customers into the Client GUI, either directly or via batch file import. The Client application applies field edits to validate the format of ANI orders, and notifies the customer up front of any orders in an incorrect format. The Client then sends a file containing new ANI orders to the CD Server. The CD Server stores all new orders to the Order Tracking Database, and eliminates the need for manual order entry at the OSC. It then validates each order against a Calling Area Database, to determine if the ANI is a valid ANI, and against an On-line Customer Information System (OCIS), to determine if the ANI will install successfully at a LEC.

For certain types of carrier customers who do not perform their own LEC provisioning, the CD Server sends all validated ANI orders to a LEC interface system, for LEC provisioning. Otherwise, resellers perform their own LEC provisioning. Either way, once confirmation of successful LEC provisioning is received, the CD Server installs each ANI in the OCIS. ANIs are thus not installed in the OCIS until they have been successfully activated at the LEC, ensuring that only valid and active ANIs are designated as such in OCIS.

Advantageously, throughout the process, the CD Server updates status of each order in the Order Tracking Database. Using the Client, a customer can view the status of their orders in real-time. Additionally, a variety of reports can be generated to provide more accurate and timely status information than prior art systems.

The various features of novelty which characterize the invention are pointed out with particularity in the claims annexed to and forming a part of the disclosure. For a better understanding of the invention, its operating advantages, and specific objects attained by its use, reference should be made to the drawings and descriptive matter in which there are illustrated and described preferred embodiments of the invention.

BRIEF DESCRIPTION OF DRAWINGS

FIG. 5(*b*) illustrates the Windows-based dialog box for creating an ANI order batch file for RELI-type customers.

FIG. 5(*c*) illustrates the Windows-based dialog box for assigning ID codes to created batches.

FIG. 7(*b*) illustrates the Windows-based dialog box displayed when the correct records option from the screen of FIG. 7(*a*) is chosen.

FIG. 8(*b*) illustrates the screen providing reporting selections for the customer.

FIG. 8(*c*) illustrates the screen displayed when an Ad-Hoc report is requested to be generated.

FIG. 9 illustrates the format of a WTN file generated by the CD Server once LEC installation confirmation is received from OCIS.

FIG. 10 illustrates an example format of the LEC Status File 550 received by the CD Server from the LECs for a customer order.

FIG. 11 illustrates an example format of a status identifier for indicating the status of customer orders being processed by the system 100.

FIG. 12, illustrates an example format of a Front End Reject Report 600 detailing the ANIs that have been front end rejected by the CD system, RELI, or the OCIS.

FIG. 13 illustrates an example format of a Batch Status Report 650 containing information suitable for presentation in additional AD-Hoc, Outbound Disconnect, and Outbound Install Reports.

FIG. 14 illustrates an example format of a Batch Summary Report 700.

FIG. 15 illustrates an example format of an Error Batch Report generated after splitting off rejected ANIs from an imported batch.

FIG. 16 illustrates an example format of a Monthly Database Extract file 800 containing updated information relevant to a specific customer account.

FIGS. 18(a)–18(c) illustrate the requesting information for Inquire ANI, Install ANI, and Deactivate ANI messages, respectively.

DETAILED DESCRIPTION OF THE INVENTION

The present invention is an order entry processing and report generation tool provided by an inter-exchange carrier, for example, MCI Communications Corp., the current assignee, that employs a Windows®-based graphical user interface to enable carrier customers (resellers) to perform their own ANI order entry for end-users, i.e., businesses or individuals, who they are activating, deactivating, or modifying, and provides processing ability to generate various summary and detail reports showing the status of batches and ANIs.

Figure 1:
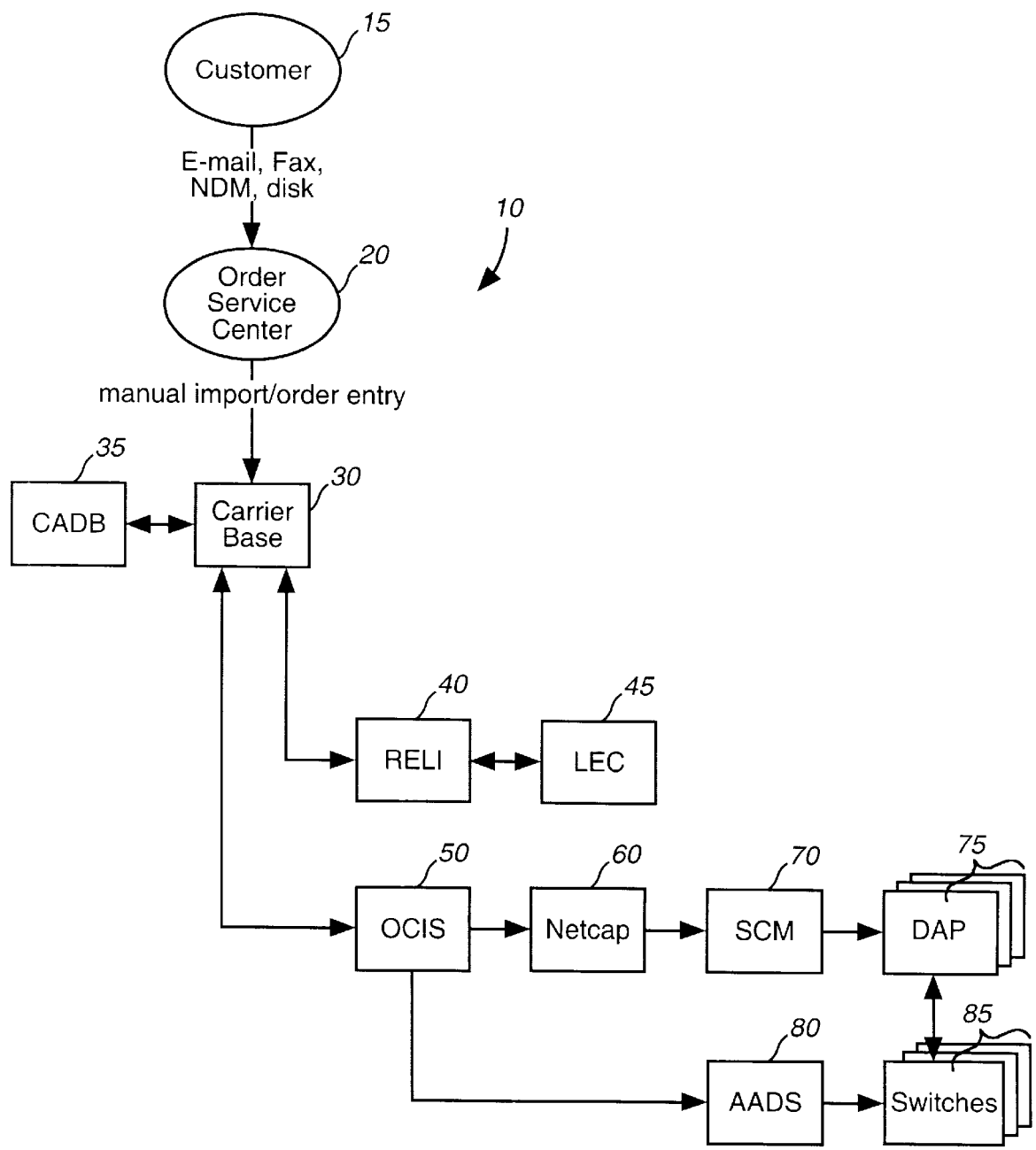
FIG. 1 illustrates the prior art carrier network systems architecture used by MCI in the past for CNS order processing and provisioning.
Figure 2:
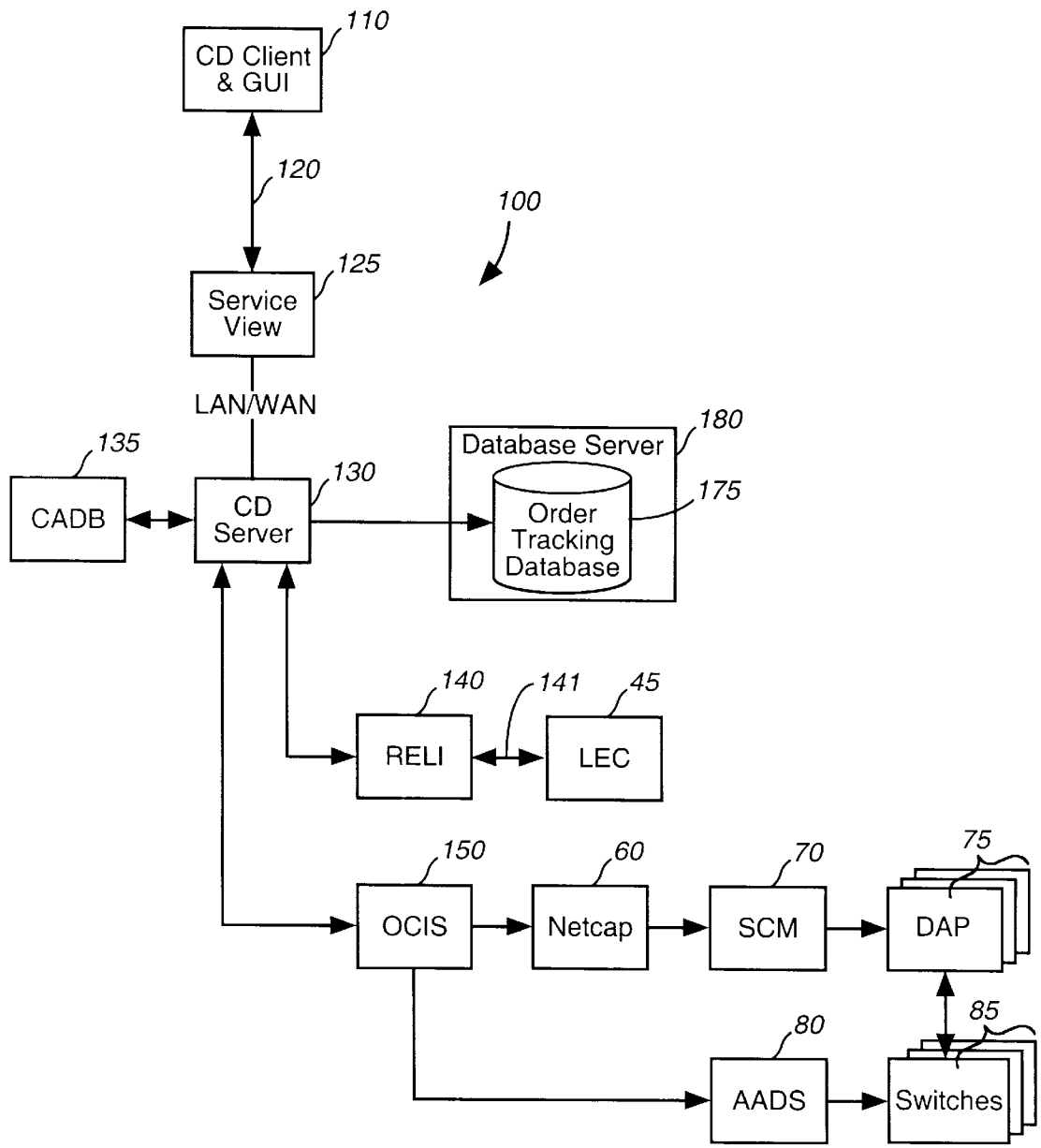
FIG. 2 illustrates the systems architecture of the order processing and reporting system of the present invention.

FIG. 2 illustrates the systems architecture of the order processing and reporting system 100 of the present invention. As shown in FIG. 2, the order processing and reporting system 100 comprises a Client application 110, a "Carrier Direct" (CD) Server application 130, an Order Tracking Database 175, an access platform ("MCI Service View" or "MSV") utility 125, and interfaces to the RELI, OCIS and CADB functional blocks 140, 150 and 135, respectively. As will be described, the services provided by the system 100 of the invention include order processing for activating, changing, or deactivating a carrier customer's ANIS; and reporting on the status of a carrier customer's ANI orders.

Particularly, the Client 110 is a PC-based software application which runs on a customer's PC, or other computer employing, for example, Windows 95® or NT for an operating system. It includes a GUI and a process for providing communications and connectivity to the CD Server 130. Customers can enter ANI orders (add, change, cancel) directly into the GUI, or they can build a file of ANI orders externally and import this file into the GUI by a batch order process. The Client 110 applies field edits to each ANI order, and notifies the customer of any orders that failed an edit, enabling the customer to correct any mistakes up front. All correct ANI orders are stored in a file to be uploaded to the CD Server 130.

The Client 110 then establishes a connection to the CD Server 130 and uploads the ANI file to the CD Server 130. Preferably, the ANI file is uploaded to the CD Server 130 by a suitable transport media 120 capable of supporting TCP/IP communications transport protocol, for example, through a network LAN connection or, via dial-up modem over the Public Switched Telephone Network (not shown). The interexchange provider, e.g., MCI, uses this same Client and GUI for its service agents in support of the methods for submitting ANI orders as explained herein. A carrier customer can still submit batch orders via e-mail, fax, or other means, to a service agent at the OSC who again enters the ANI orders into the Client GUI 110. The Client GUI is also used by service agents and account managers for customer account management, e.g., for entering new carrier customers.

Dialup modem access supporting TCP/IP transport to the CD Server 130 is enabled by an MCI Service View platform 125, a Window® based platform on which several network management and usage analysis tools reside. The Service View 125 provides a common launching point for these applications, and comprises routers, firewalls, and a series of midrange computer servers (not shown) which provide user authentication. When a customer dials up for access to the CD Server 130, the customer first accesses a Service View server. The Service View server authenticates the customer with user i.d.'s and passwords, determines where to send them, and then connects them to the CD Server 130. Additionally, remote customer access to the Service View platform 125 and CD Server 130 can be provided by the PSTN 120, but can likewise be provided by a private network. It should be understood that other communications transport media providing remote access to the CD Server 130 in accordance with TCP/IP protocol can be used, alone or in addition to other types of telecommunications technology including: ATM, cellular, dial-up modem over a public switched telephone network, ISDN, etc.

Figure 17:
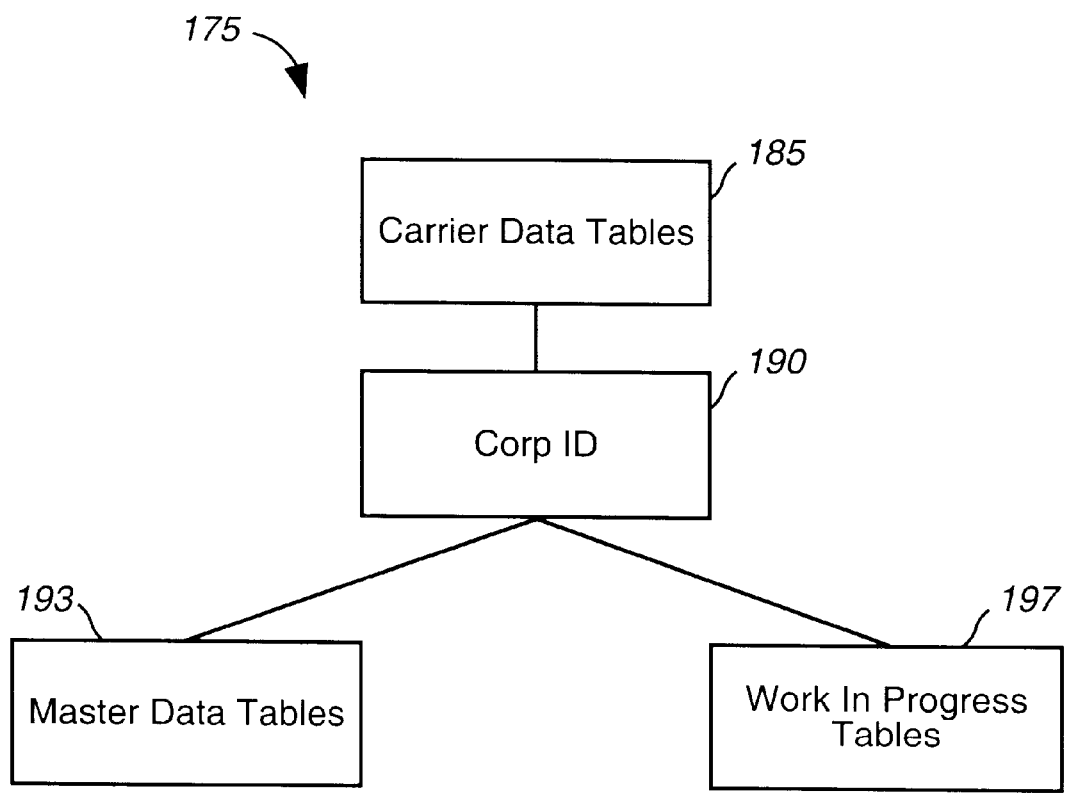
FIG. 17 illustrates the organization of the order tracking database 17.

The CD Server 130 is a software application which resides on a midrange computer, e.g., a DEC Alpha 4100. It provides the processes for connectivity with Clients, validating ANI orders, storing ANI orders, updating order status, compiling and generating reports for customers, and supporting ad-hoc queries against the Order Tracking Database 175, which is used as a repository for all orders and their status. The Order Tracking Database 175 and Database Server 180 may reside on the same or a different computer as the CD Server. FIG. 17 illustrates the organization of the Order Tracking Database 175 which, in the preferred embodiment, operates under control of a Microsoft SQL Server 6.5 running under Windows NT®. It should be understood that any other equivalent database server may be employed. As shown in FIG. 17, the order tracking database 175 is organized into three (3) main sections linked by a Corp ID table 190: a first section comprising the Carrier Data Tables 185 containing information about each carrier and their contacts; a Master Data Table 193 containing all of the Batch and ANI data, including those ANIs which have and have not been installed; and, a third Work in Progress Table 197 containing all of the Batch and ANI data not yet installed in OCIS. All customer account information contained in the customer reports is retrieved from the Master Data Table 193, as will be explained.

Referring back to FIG. 2, the CD Server 130 receives all ANI orders from the Clients of the customers and stores these orders in the Order Tracking Database 175. It then performs validations of these orders against both CADB 135 and OCIS 150 via messaging and then, for RELI customers, sends orders daily to RELI 140 for LEC provisioning. Once confirmation of successful LEC provisioning is received back from RELI, the tracking database records are updated with the updates from RELI, and the CD Server 130 submits the orders to OCIS 50 for installation via messaging. Throughout the process, the CD Server 130 updates order status in the Order Tracking Database 175, and provides reports such as front-end rejects, outbound installs, outbound disconnects, batch status, aged LEC rejects, pending LEC action, batch summary, and LEC disconnects to the customers via the GUI 110. The CD Server 130 also supports ad-hoc queries against the Order Tracking Database.

Both the respective Client and Server interfaces may use Internet Protocol (IP) communications, however, other methods of communication, such as analog dial-up, may be employed. To manage these communications and provide a user-friendly interface for reporting purposes, a Web interface is provided by encapsulating a Web browser (e.g., Internet Explorer®) in the Client GUI application, written, for example, in C++ programming language.

Specifically, the browser functionality was incorporated into Carrier Direct by implementing Active-X controls provided by Microsoft, Inc. to initiate a browser within the C++ executable code. Active-X controls provided by Microsoft are utilized to initiate a browser within the C++ executable code. In doing this, each user's access to the Web site can be controlled to allow them to see only what their profile allowed, whether it was just a part of the customer, or only one customer, or for the internal service reps, several customers. Using the browser functionality the user could access reports and some other functions but could not select Internet addresses to go to. Uniform Resource Locators ("URLs") are automatically populated and authentication/access procedures are automatically performed by the Client (using the embedded Internet Explorer) to take customers to the CD Server's IP address and navigate throughout the Web site. For example, when a customer logs on to the CD Server to retrieve a report, they are presented with a Hypertext Markup Language ("HTML") file displayed by Internet Explorer. A customer can then submit a request for a report, e.g., Front-end Rejects report, for its ANI orders, and view the report as HTML Web pages. This method provides security since a customer cannot view the reports of other customers because the URLs and commands are managed by the Client application. That is, after the initial security check, MCI Carrier Direct implements a form of "cookies" for passing information from one Web page to another, by storing some information, i.e., a cookie, on the customer's machine, to allow access to subsequent Web pages. Particularly, the data making up the customer's report screen is transmitted as packets between the client and server computers. At the receiving end, the packets are reassembled and when complete, are processed by the GUI application. To enable the application to maintain the ability to route through the reporting screens, the cookie has been programmed to always reside in a standard location, in all cases. That way, when the packets are reassembled, the same location can be accessed at all times and the cookie information resident there can be used to validate the user security with the current page.

The CADB 135, RELI 140, and NOPS/OCIS 150 are MVS applications resident on mainframe computers. The CD Server 130 communicates with each of these applications via IP messaging over a WAN. As shown in FIG. 2, the CD Server 130 interfaces to CADB application 135 via IP messaging to validate new ANIs against official ANI tables stored in CADB 135 and updated by LECS. The CD Server 130 interfaces to RELI block 140 via NDM 141, that is, batch files for ANI orders are transmitted to RELI via NDM. RELI 140 returns confirmation of status to the CD Server 130 via IP messaging or NDM.

The OCIS application 150 is partitioned into two distinct systems: a first MVS mainframe application, O-RES, is for residential customers of the inter-exchange carrier (MCI) and a second MVS mainframe application, O-BUS, is for business customers (including carriers and resellers) of the inter-exchange carrier, MCI. The CD Server interfaces with O-BUS via IP messaging and is used for ANI orders (orders are to add, change, or cancel a reseller's ANI in OCIS). Preferably, there are three types of messages that the CD Server 130 sends to the O-BUS application: 1) "Inquire ANI" messages which are sent to validate an ANI in OCIS prior to LEC provisioning. Preferably, a multitude of ANIs, e.g., fifty, can be verified against the CADB table to determine if an ANI is already installed in OCIS; 2) "Install ANI" messages which are sent to install up to fifty new ANIs for a reseller in OCIS with a status for each ANI returned indicating success of failure of the install; and, 3) "Deactivate ANI" messages which are sent to deactivate up to fifty ANIs for a reseller from an OCIS account.

The CD Server 130 interfaces with O-RES application via a 3270 terminal emulation and screen scraping and is only used to deactivate the ANI of an MCI customer when that customer signs up with a reseller, and that reseller is activating the ANI under their account.

Figure 3A:
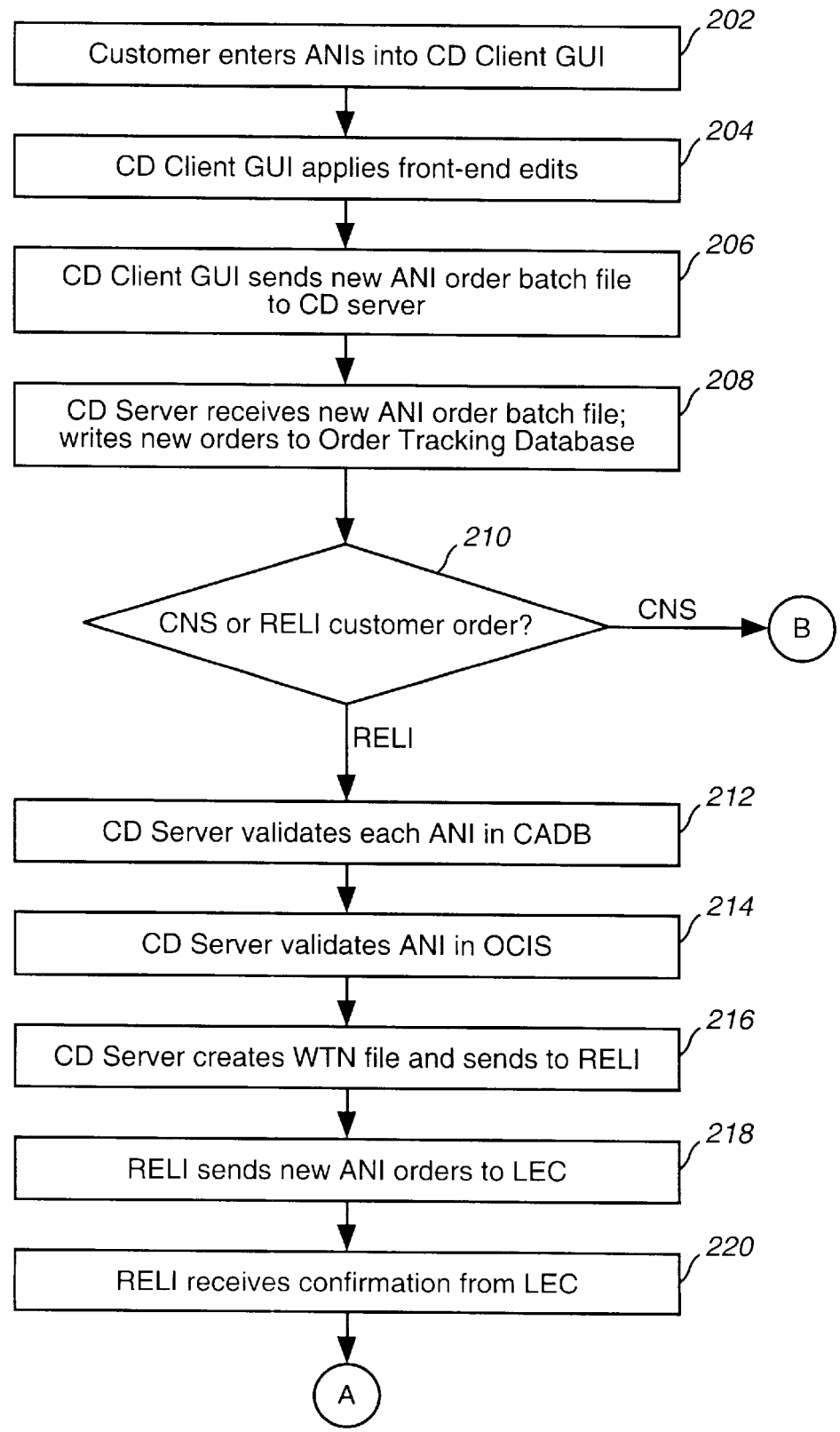
FIGS. 3(*a*) and 3(*b*) and 3(*c*) are flowcharts illustrating the process for activating ANIs.
Figure 3B:
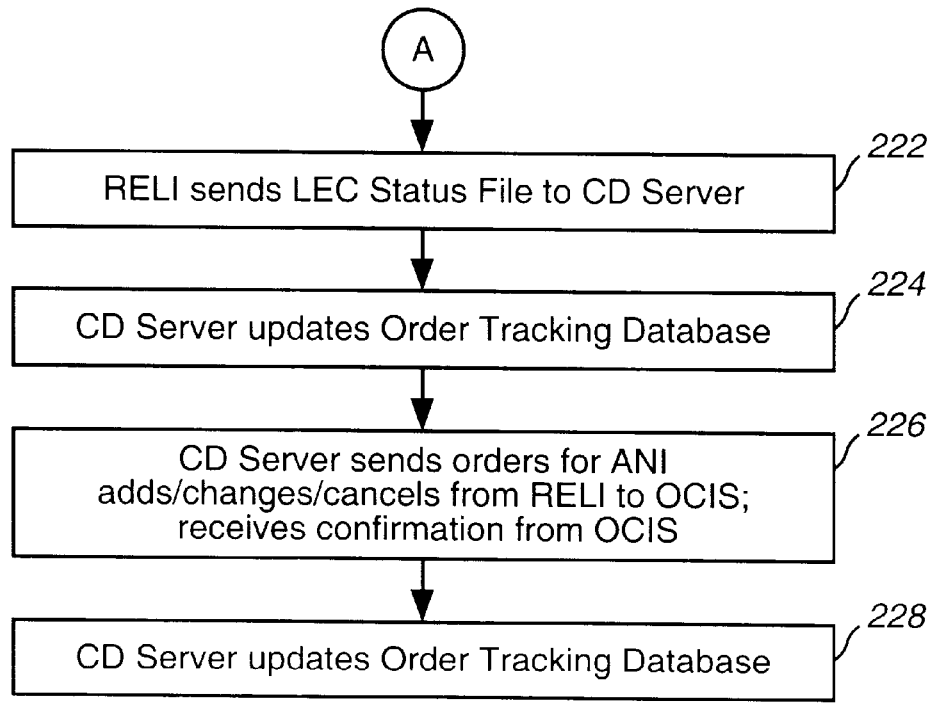
Figure 3C:
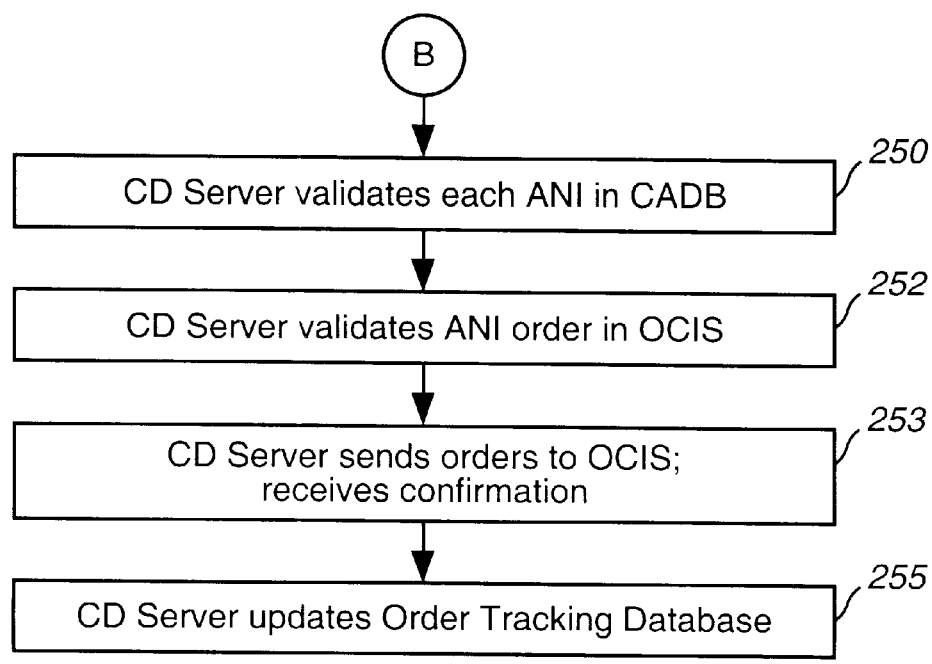

FIGS. 3(a)–3(c) illustrate the process for activating ANIs performed when a carrier customer submits orders for new ANIs. As will be described herein, a distinction is made between the two types of carrier customers utilizing the system 100: 1) RELI customers who use the system 100 for all functions associated with ANI order processing, including activating/deactivating ANIs within the inter-exchange carrier's, e.g., MCI's, systems, as well as LEC provisioning; and, 2) CNS customers who perform their own LEC provisioning and use the system 100 for submitting orders to the inter-exchange carrier, e.g., MCI. Both types of customers can use the system 100 for reporting. Even though CNS customers perform their own LEC provisioning, a confirmation will still be received from the LEC indicating that a CNS customer's ANIs were successfully PIC'd to the inter-exchange carrier, e.g., MCI. This confirmation is received via the QUICK PIC system and is used to update status in the Order Tracking Database 175, so that CNS customers can view the LEC provisioning status of their ANIs (when LEC provisioning has completed).

An overview of the order entry and report generation methodology is now described with reference to FIGS. 3(a)–3(c).

As illustrated at step 202 in FIG. 3(a), a reseller, i.e., either a CNS or RELI customer, first enters the ANIs of their customers into the Client GUI 110, either directly (interactive) or via imported batch file, for later upload to the CD Server 130. Whether provided directly through the GUI or through an imported batch file, the information must indicate whether the carrier customer is a CSN or a RELI customer. At step 204, the Client GUI applies frontend field edits to validate the new ANIS, i.e., ensure that they are in the correct format, before being accepted. If the order is not in the correct format, the customer can take immediate action to correct it, or, move the affected ANI's to a separate batch so that the valid orders can still be immediately submitted. At step 206, the Client 110 sends the new ANI order batch file to the CD Server 130 with an assigned batch number and the current date that it is sent. At step 208, the CD Server receives the new ANI order batch file, and writes the new orders to the Order Tracking Database 175 (FIG. 2) with initial status.

At step 210, a decision is made if the current customer is a CNS or RELI customer. If the current customer is a RELI customer, then the process proceeds to step 212, where the CD Server 130 validates each new ANI against tables in the Calling Area Database (CADB) 135 to ensure that the ANI is valid and, additionally, proceeds to step 214, where the CD Server 130 validates each ANI in OCIS 150 by sending an "Inquire ANI" message to OCIS. Validation in OCIS determines up front if an ANI should install successfully prior to sending it to RELI, which reduces the number of ANI orders rejected at the LEC. For example, if an "Install ANI" order is received for an ANI which is already installed in OCIS for another customer, the CD Server will not send the ANI to RELI until it is determined who owns that ANI. Then, at step 216, the CD Server creates a Working Telephone Number ("WTN") file containing all new confirmed and clean ANIs to be provisioned at the LEC. The CD Server sends this file to the RELI 140, via NDM, usually on the same day that the orders are processed.

FIG. 9 illustrates the WTN input file created and generated by the CD Server 130 containing the new ANI's to be provisioned at the LEC for RELI customers. The ANIs will be edited to verify that they will pass OCIS edits during installation once the LEC confirmation is received. As shown in FIG. 9, the WTN file 500 includes the following fields: a WTN field 502; a BTN field 504; a CIC Code field 506; a corp-ID field 508; a service type field 510 (indicating, for example, PIC install (PI) or PIC all (PA)); customer type field 512 (indicating, for example, business, residential, or Centrex); end-user name and address fields 514; as well as the terminal ID field 516; current date field 518; and, PIC change fee flag 520. A header record (not shown) is provided and includes the header record indicator, header sequence number and RELI Order Entry Process Date. A trailer record (not shown) is provided and includes the total record count.

Referring back to FIG. 3(a), at step 218, the RELI 140 translates the ANI orders received from the CD Server into the 960 byte Customer Account Record Exchange ("CARE") format and sends these files to the LECs 45 responsible for each ANI via an NDM link. Many systems and methods for performing this task exist. A preferred one is the above-mentioned "Quick PIC" method such as described in the above-mentioned co-pending patent application U.S. Ser. No. 08/923,872.

At step 220, the RELI 140 receives a confirmation from the LEC indicating whether or not the ANI was successfully activated, i.e., PIC'd to the correct CIC. Responses from the LECs vary from two to seven days. If the LEC has not responded to an order within eight days, the RELI process 140 will automatically resend the order one time to the LEC on the eighth day, which orders will appear on a 'Pending BOC Action' report (discussed below). The LEC also sends confirmation of successful ANI activations that were submitted by CNS customers external to the system. Once the LEC responds with a confirmation that an ANI has been PIC'd to the requested CIC, the ANI will be installed in the NOPS/OCIS order entry system which feeds the billing systems.

As indicated at step 222, FIG. 3(b), the RELI 140 then sends an LEC status file to the CD Server 130, indicating the status updates for orders sent to RELI for provisioning as well as LEC initiated connects and disconnects. Particularly, the LEC Status File is generated by RELI 140 and contains a subset of the 960 byte CARE record as well as additional status information. Preferably, a single LEC Status File is transmitted to the CD Server 130 each day, and the CD Server splits the file into customer specific files based on CIC and Corp ID. Once the file is created it is available for customer retrieval. It should be understood that if the CNS customer has more than one RELI Corp ID, a default Corp ID and a default sub account number will assigned in the Server database. The default Corp ID will be assigned to all LEC initiated transactions and these transactions will appear on the LEC Status File associated with the default Corp ID. Once an order is sent to the LEC, the customer will receive an internal Status code on that order indicating that it was sent to the LEC. In this manner, the customer is made aware of the Status of an order at all times. The most recent LEC Status record received remains in effect until a new Status is received; only orders on which activity occurred that day will have an LEC Status record in the LEC Status File.

The LEC Status File is used to update the Status information in the order tracking database and is stored for a period of time. In the preferred embodiment, the period of time may be fourteen days, after which time it is purged. If no transactions occur on a particular day, a message is sent indicating that no transactions were processed. This ensures that the customer understands that no transactions occurred rather than a file was not generated.

As illustrated in FIG. 10, the LEC Status File 550 contains all daily transactions received back from the LECs for a customer order from the prior day. Notably, it includes a Transaction Code Status Indicator ("TCSI") field 555, which contains a four-digit number assigned, e.g., by Bellcore, and indicates the response received from the LEC. It also includes a corresponding RELI status code field 560 which is provided with each record and is an interpretation of the TCSI provided by the LEC.

Preferably, there are five (5) types of responses which can be received from the LECs: 1) a Confirmation indicating that the ANI has been provisioned by the LEC to the requested CIC code. The appropriate system response is that the ANI will be assigned to a default Corp ID and loaded into NOPS/OCIS; 2) a LEC Reject indicating that the ANI was rejected at the LEC and has not been provisioned. Rejects will appear on the Aged LEC Reject report after being in Reject Status for a period of time, e.g., five days. If the reason for the LEC reject can be corrected, the ANIs must be entered into the system as a new install. As CNS customers are responsible for provisioning, they are responsible for researching and resolving LEC rejects. ANIs not corrected and present will be purged from the database; 3) an LEC Installs indicating that ANI installation is initiated by the LEC and a file is sent to the CD Server. Once the install confirmation has been received by RELI, RELI will automatically send the ANI to the CD Server to be installed into NOPS/OCIS; 4) an LEC Disconnect indicating that an ANI disconnection is initiated by the LEC and a file is sent to the CD Server. The ANI will be disconnected from NOPS/OCIS and the CNS customer will be notified of the disconnect via the LEC Status File, as they (CNS customers) cannot request an ANI to be canceled in OCIS. The CD Server will automatically disconnect the ANI from NOPS/OCIS; and, 5) an Account Maintenance indicating that the ANI has had a non-provisioning related change (i.e. address change) initiated by the LEC. This change will be included in the CARE record sent by the LEC to RELI. The CD Server will relay changes to the customer via the LEC Status File.

Figure 19A:
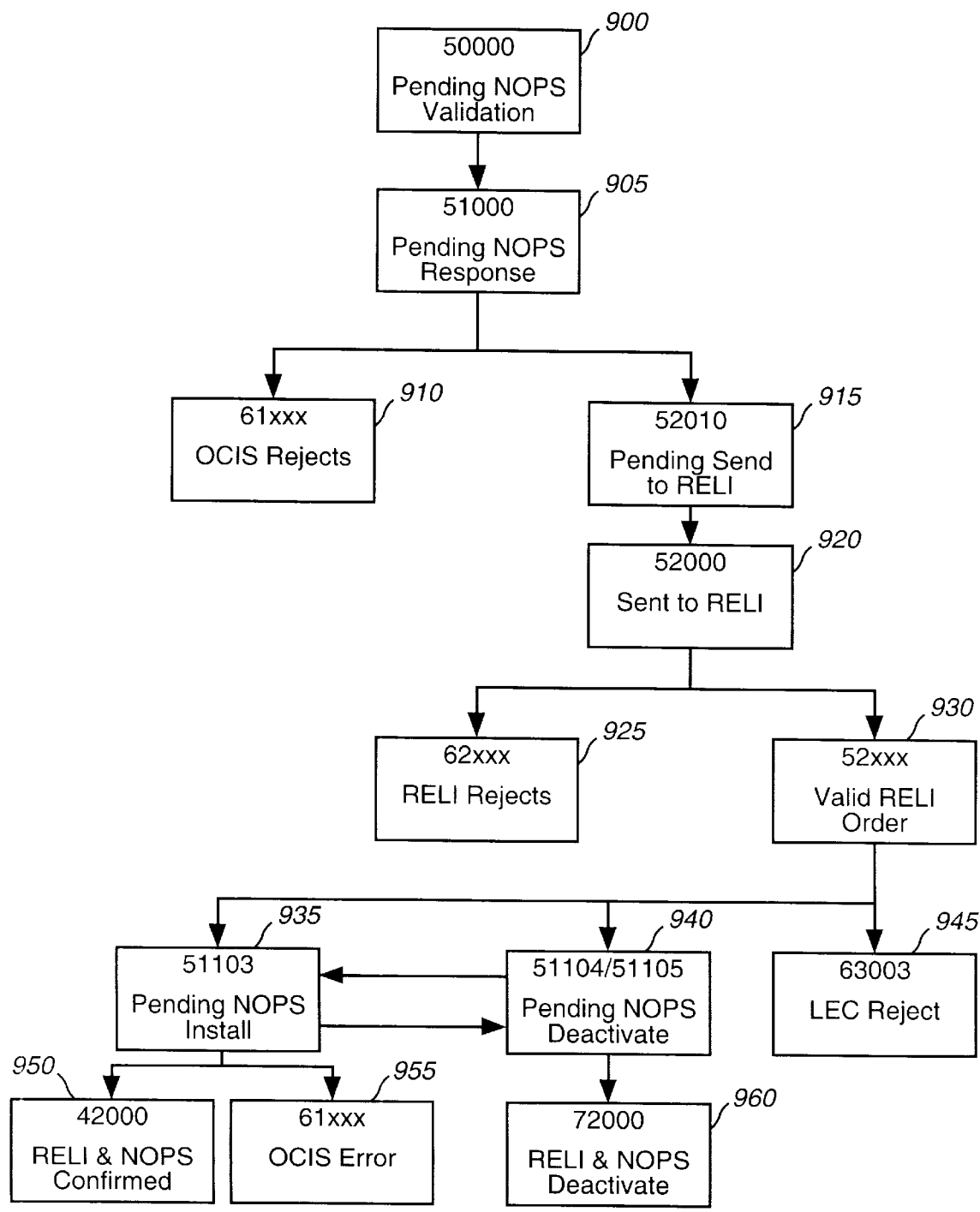
FIGS. 19(a) and 19(b) illustrate the life cycle of an ANI order for RELI and CNS customers, respectively.
Figure 19B:
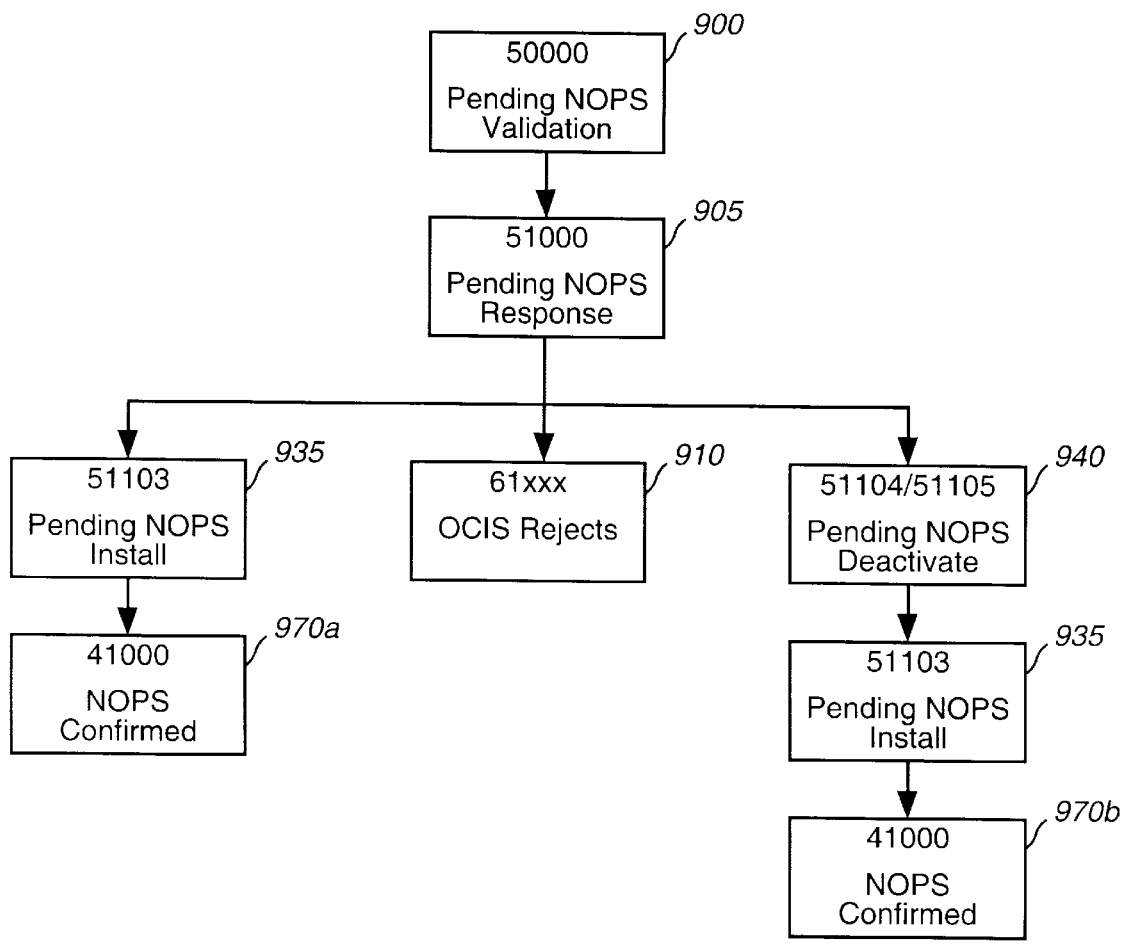

Generally, as described herein, all reporting and status files will contain either reject codes, pending codes, disconnect and install codes provided in a concise format as illustrated in FIG. 11. As shown in FIG. 11, the status codes include: a first field, depicted as "Z", indicating the status code, i.e., rejected, ending, disconnected and confirmed ANI status; a second field, depicted in FIG. 11 as "Y" indicating the system containing the status, e.g., GUI, CD Server, NOPS/OCIS, LEC (ANI rejects) or RELI; and a third field, depicted as "XXX", indicating the reason code generated by the corresponding system. For instance, FIGS. 19(a) and 19(b) illustrate the life cycle of an ANI order for RELI and CNS customers, respectively. As shown at block 900 in FIG. 19(a), after front-end validated orders are received by the GUI and sent to OCIS and CADB for further validation, the status of the ANI is formatted as a number 50000, indicating "Pending NOPS Validation" where Z field="5" indicating pending status, "Y" field=0 indicating GUI received, and the 'XXX' field=000, for instance, indicating order received/pending NOPS send. Once sent, as shown at block 905 in FIG. 19(a), the new status code is formatted as a number 51000, with the "Y" field=1 indicating that the ANIs have been sent to NOPS/OCIS via messaging and that the order is pending OCIS validation. At OCIS, the ANI order may be either rejected at block 910, with a new status code formatted as a number 61XXX where "6" indicates a rejected status, "1" indicates NOPS/OCIS and "XXX" indicates the reason reject code. Otherwise, as indicated at block 915, the ANI order is validated and sent to RELI where it attains status indicated as a number 52010, where "5" indicates pending status, and "2" indicates pending in RELI. Once the order is sent to RELI, as indicated at block 920, it may be either be rejected by RELI, as indicated at block 925 or may be pending in RELI awaiting LEC action as indicated at block 930. While pending in RELI, the status indicator is formatted as the number 52XXX indicating RELI pending status codes including: awaiting equal access date; pending BOC action; reject; pending confirmation; confirmed; NOPS cancel; LEC disconnect; and pending verification. The RELI status file of FIG. 10 containing RELI status codes 560 will indicate these status codes.

For those orders rejected at RELI at block 925, the status indicator for that ANI is formatted as number code 62XXX and represents RELI reject status codes indicating RELI front-end rejects, with representative reject reason codes 'XXX' including: invalid Service type; invalid "PA" Service type for the particular LEC; invalid CIC; invalid Corp ID; invalid LATA indicator; invalid name; invalid BTN; invalid Customer type; invalid LOA; invalid PIC fee flag; invalid address; and invalid LEC for the particular CIC, etc. It should be understood that a variety of reasons codes exist and one skilled in the art can devise codes based on specific functional and system requirements.

From RELI pending status (block 930), the ANI order is updated at block 935 as pending NOPS/OCIS install, or, updated at block 940 as pending NOPS/OCIS deactivate, or, has been rejected by the LEC at block 945. Representative status indicators are shown in each of these blocks.

From the pending NOPS/OCIS install (block 935), the ANI order is updated at block 950 to indicate both RELI and NOPS confirmation. A status indicator at this step is formatted as "42000", with the Z field="4" and the "Y" field=2, indicating both RELI and NOPS confirmation, i.e., ANIs have been installed in NOPS/OCIS for RELI customers and the ANI is now active at the LEC and in the order entry system that feeds billing. Otherwise, as indicated at block 955, the ANI order is rejected by the OCIS due to an OCIS installation error. From the pending NOPS/OCIS deactivate (block 940), the ANI order can attain a deactivate status at block 960 with a status indicator formatted, e.g., as number 72000, with the "Z" field="7" indicating disconnected status.

Referring to FIG. 19(b), for CNS customers, the life cycle of the ANI install order is the same, with corresponding block numbers indicated, however, the confirmation is received from NOPS/OCIS only, as indicated at blocks 970a and 970b.

Referring back to FIG. 3(b), at step 224, the CD Server 130 updates the Order Tracking Database 175 with the new status of each ANI received in the LEC status file. Then, at step 226, the CD Server 130 sends orders for ANI adds, changes, and cancels to the OCIS 150. For ANI adds, these will be ANIs that have already been successfully activated by the LEC, so that any ANI listed in OCIS as active will really be active. The CD Server 130 receives confirmation from OCIS on order completions. Then at step 228, FIG. 3(b), the CD Server 130 updates the Order Tracking Database 175 with the new status of each ANI based on confirmation received from the OCIS at step 226.

Referring back to FIG. 3(a), if at step 210, it is determined that the customer is a CNS customer, then the process proceeds to step 250, as shown in FIG. 3(c), where the CD Server 130 first validates each new ANI against tables in the Calling Area Database 135 to ensure that the ANI is valid and, additionally, proceeds to step 252, where the CD Server 130 validates each ANI in OCIS 150 by sending an "Inquire ANI" message to OCIS. Validation in OCIS determines up front if an ANI should install successfully. Then, as indicated at step 253, the CD Server sends CNS customer orders to OCIS to activate ANIs in OCIS. ANIs are entered into OCIS as 10xxx NIs, which indicates these ANIs are not directly subscribed to MCI for long distance. MCI uses this designation to determine whether to bill the reseller rather than the caller for calls made from these ANIs. The CD Server 130 then receives confirmation from OCIS.

At step 255, FIG. 3(c), the CD Server 130 then updates the Order Tracking Database 175 with the new status of each ANI based on confirmation received from OCIS in step 253.

A similar process is performed for ANI deactivations with the exception that validations against CADB and OCIS are not needed, since the ANIs in these orders are already active in the LEC's and inter-exchange carrier's networks.

As described above (step 202, FIG. 3(b)) the carrier customer can enter the ANI orders (add, change, cancel) directly into the GUI, or they can build a file of orders externally, through other software applications, in a predefined batch record format which may be imported as a file into the GUI by a batch order process.

Figure 4:
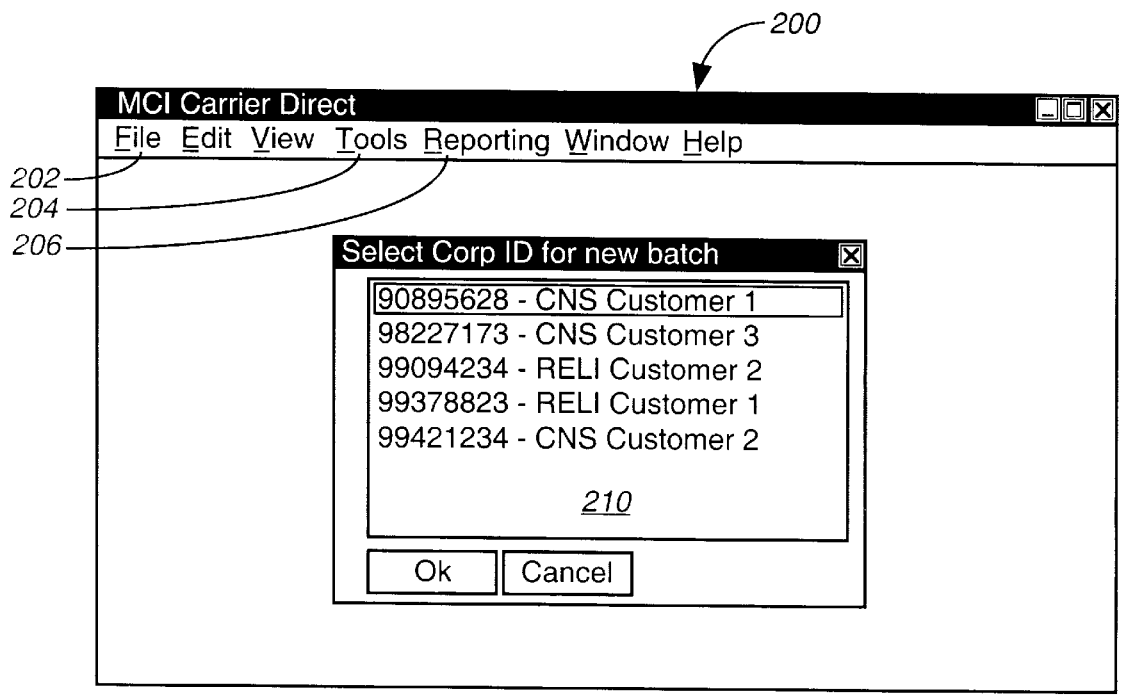
FIG. 4 illustrates the Windows-driven GUI providing a main screen menu 200.

FIG. 4 illustrates the Window® driven GUI providing a main screen menu 200 that includes the following drop-down menus: a file menu 202 to provide access to an existing batch in progress or, to start a new order entry batch; and, a reporting (drop-down) menu 206 enabling the user to perform ad hoc queries into the order tracking database, as well as save the results of an ad hoc query in a local text file, or access standard reports generated for a prior time period. A tools (drop-down) menu 204 is also provided to access a Corp ID setup box to enable entry of customer Corp IDs, and, distribution manager dialog box (not shown) that enables contact information to be entered into the database which is desirable when carriers need to be contacted.

When a new ANI order entry batch is to be entered directly via the GUI, a first Corp ID selection dialog box 210, such as illustrated in FIG. 4, is displayed for those carriers with multiple Corporate Ids ("Corp ID"). When the carrier has only one Corp ID, the dialog box 210 will not be displayed.

Figure 5A:
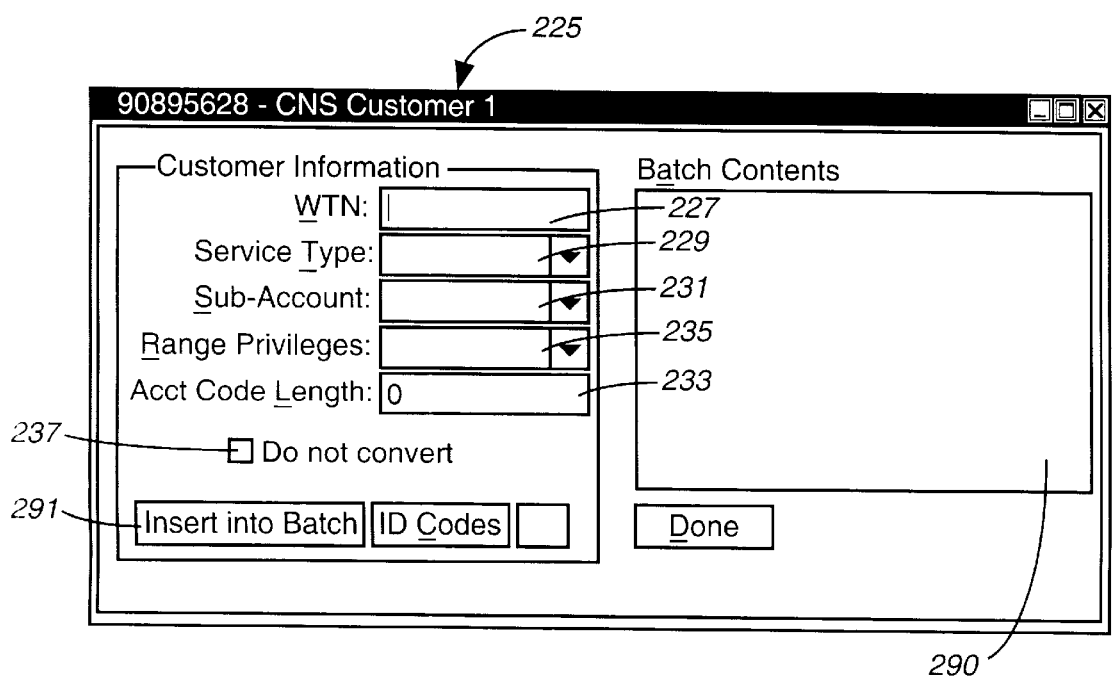
FIG. 5(*a*) illustrates the Windows-based dialog box for creating an ANI order batch file for CNS-type customers.
Figure 5B:
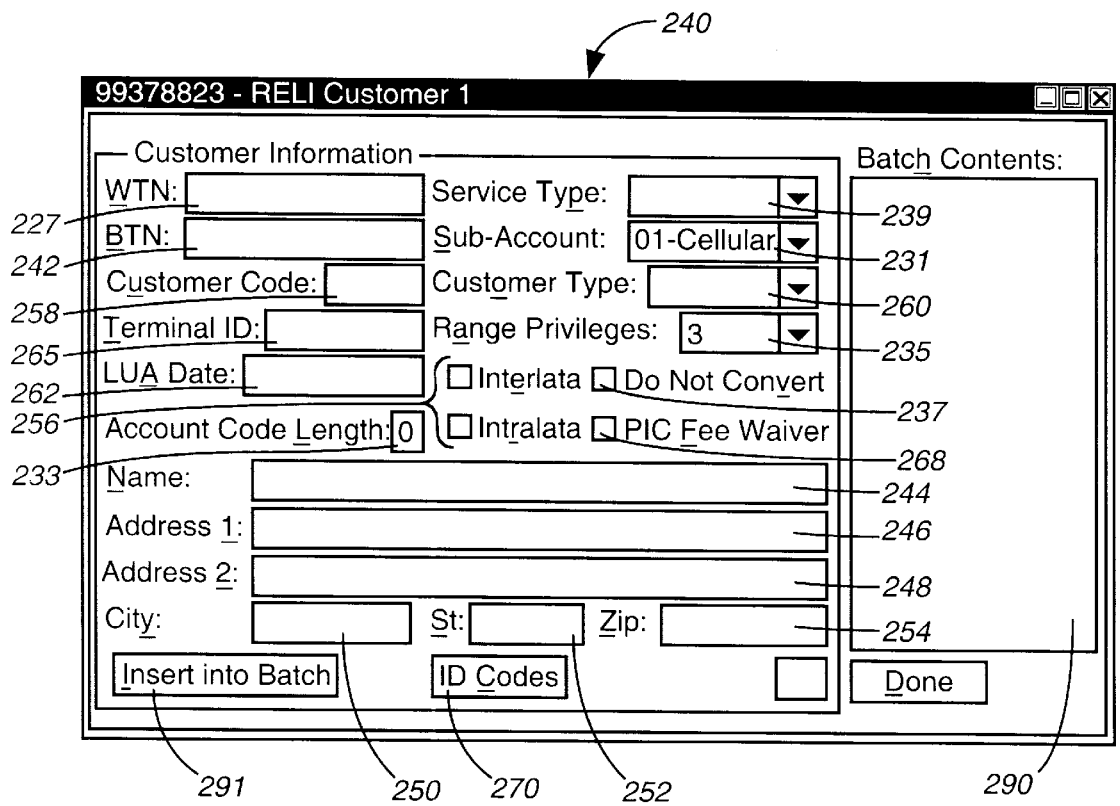
Figure 5C:
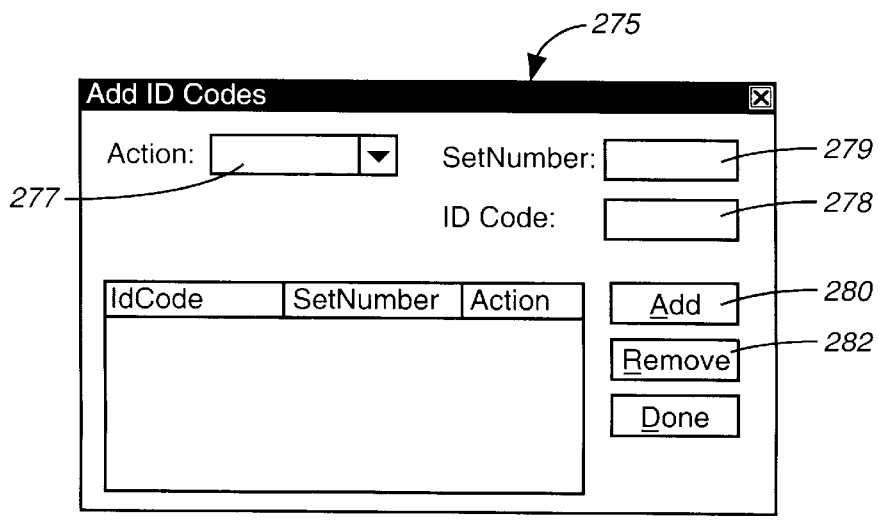

The system has different Batch screens depending upon whether the Corp ID selected is CNS or RELI. For CNS customers, a Customer Order Entry dialog box 225, such as illustrated in FIG. 5(*a*), is displayed. As shown in FIG. 5(*a*), the customer on-line order entry fields include: a WTN entry field 227 for entry of a 10-digit numeric value indicating the customer's working telephone number; a Service Type entry field 229 which provides a pull-down menu of selections indicating the type of service employed for the ANI and including the following selections: "AA" for adding, "DD" for deleting, or "MM" for maintenance of the ANI order entry. In the preferred embodiment, Adds and Deletes can be combined in the same batch, but maintenance service types must be in their own batch; a Sub-Account entry field 231 which provides a pull-down list providing all valid choices of two-digit values (00–99) indicating the number of customer sub-accounts which have been set up by the OSC; an Account Code Length entry field 233 for entry of a numeric, 1-byte field indicating the account code with numbers 2–7 being the valid choices; a Range Privileges entry field 235, which provides a pull-down list providing all valid choices of numeric one-digit values with the value "0" indicating no long distance calls permitted, a value "2" indicating long distance calls are permitted domestically, a value "3" indicating no limitation on the call areas for long distance, and the value "4" indicating long distance calls are only permitted within the NPA area; and, a conversion indicator check box 237, such that, when checked, indicates that ANI information already in the inter-exchange carrier's database is not to be converted to the requesting carrier's account.

For RELI customers, the Customer Order Entry dialog box 240, such as illustrated in FIG. 5(*b*), is displayed, which contains the same WTN field 227, Sub-Account field 231, Account Code Length field 233, conversion indicator check box 237, and, Range Privileges field 235 entries as for the CNS customers (FIG. 5(*a*)), in addition to the following on-line order entry fields: a Service Type entry field 239 which provides a pull-down menu indicating type of service selections including "PA" indicating PIC All, "PI" indicating PIC Install, or "MM" for maintenance of the ANI order entry; a BTN entry field 242 for entry of a 10-digit numeric value indicating the customer's billing telephone number; a Customer name entry field 244 for entry of up to 30 alphanumeric characters; a first Customer Address line entry field 246 and a second Customer Address line entry field 248 each for accomodating entry of up to 30 alphanumeric characters; a City entry field 250 for accomodating entry of up to 23 alphanumeric characters; a State entry field 252 for accomodating entry of the two-digit alpha state codes; a Zip Code entry field 254 for accomodating entry of either a 9digit numeric zip code or 5 digit numeric zip code; LATA Indicator check boxes comprising an Interlata selection box 256 or Intralata selection box 257; a Customer Code entry field 258 for accomodating entry of the 3-digit numeric LEC Account number; a Customer Type entry field 260 which provides a pull-down menu indicating type of customer selections including "B" for business; "R" for residential, or "X" for Centrex; an LOA Date entry field 262 for accomodating entry of the current date in MM/DD/YYYY format;
a Terminal ID entry field 265 for accomodating entry of a 4-digit numeric value; and a PIC Change Fee check box 268 which when selected indicates that the carrier customer is to pay the PIC fee to convert the ANI to its CIC. In both FIGS. 5(*a*) and 5(*b*) the insert into batch button 291 can be selected to enter the current ANI order into the batch. The batch contents field 290 indicates the current ANI orders which have been input into the current batch.

For both CNS or RELI customers, if ID Code information is to be included, then an ID Codes button 270 is provided which will call up the ID Codes dialog box 275 as shown in FIG. 5(*c*). ID Codes are an optional feature that can be added (or deleted) to the WTN's of the batch. When selecting the Action option 277, a pull-down list is provided enabling the following action choices: "c" indicating creation of a new ID Code set; "a" indicating addition of new ID codes to an existing ID Code Set; "e" indicating assignment of an existing ID Code Set to the WTN; "r" indicating removal of ID Codes from an existing ID Code Set; and, "d" indicating deletion of an existing ID Code Set from the WTN. Regardless of the selected action, the customer is prompted to enter a numeric ID Code Set number in entry field 279. When creating a new ID Code set, adding new ID codes to an existing ID Code Set or removing ID Codes from an existing ID Code Set, a numeric ID Code must be entered in entry field 278. After all of the required fields are filled in, the add button 280 may be selected or, if an ID Code is to be removed before adding it to the WTN, the ID Code may be highlighted and removed by selecting the remove button 282.

It should be understood that all of the information entered into each current ANI order entry is field validated, i.e., front-end edits are made to ensure that information is in proper format. For example, the WTN/BTN/ANI numbers must be numeric and 10 digits, and the service type must be PI, PA or MM for RELI customers or, AA, DD, MM for CNS customers while ensuring that maintenance MM's are in a separate file. If an audit determines an incorrect entry has been made, the user will be prompted for corrective action. When the current ANI order (and any needed ID Codes) is completed, the record is inserted into the batch. The above entry and validation process is continued for each ANI desired to be added to the batch. Through the file menu screen of FIG. 4, the new batch record created is treated as any other file, and prior to submission to the CD Server, may be saved in a directory for later acquisition as a pending branch for further editing, e.g., adding new ANIs.

In order to submit the created ANI order batch to the CD Server 130, the GUI automatically creates a header record having the following fields: a Header Record Indicator having a value "HD"; a numeric CIC code; a numeric Corp ID; a Provisioning Indicator having the value "C" indicating a CNS customer; and filler spaces. Header records for RELI orders contain the same fields, however, the Provisioning Indicator has the value "R" indicating a RELI customer. For both CNS and RELI orders, a trailer record is formatted with the following fields: a Trailer Record Indicator having a value "TR"; a Total Batch Record Count of numeric value; and filler spaces. For customers who have selected ID codes to be assigned to their ANIs, an ID codes file is created and submitted only after the corresponding ANI order entry file has been submitted. The ID codes file (not shown) is formatted to contain both ID Codes header and trailer records. For both the CNS and RELI customers, the ID codes header and trailer records have the same format as in the corresponding ANI order entry header and trailer records, however, the Provisioning Indicator has the value "I" indicating an ID code.

It should be understood that the GUI 110 is not needed to create batches and that a carrier customer may create a batch file using any system for export to the system as long as the correct file format is adhered to. Particularly, for each CNS and RELI batch file, respective header and trailer records must be present in the correct format for the server to correctly process the order.

Figure 6:
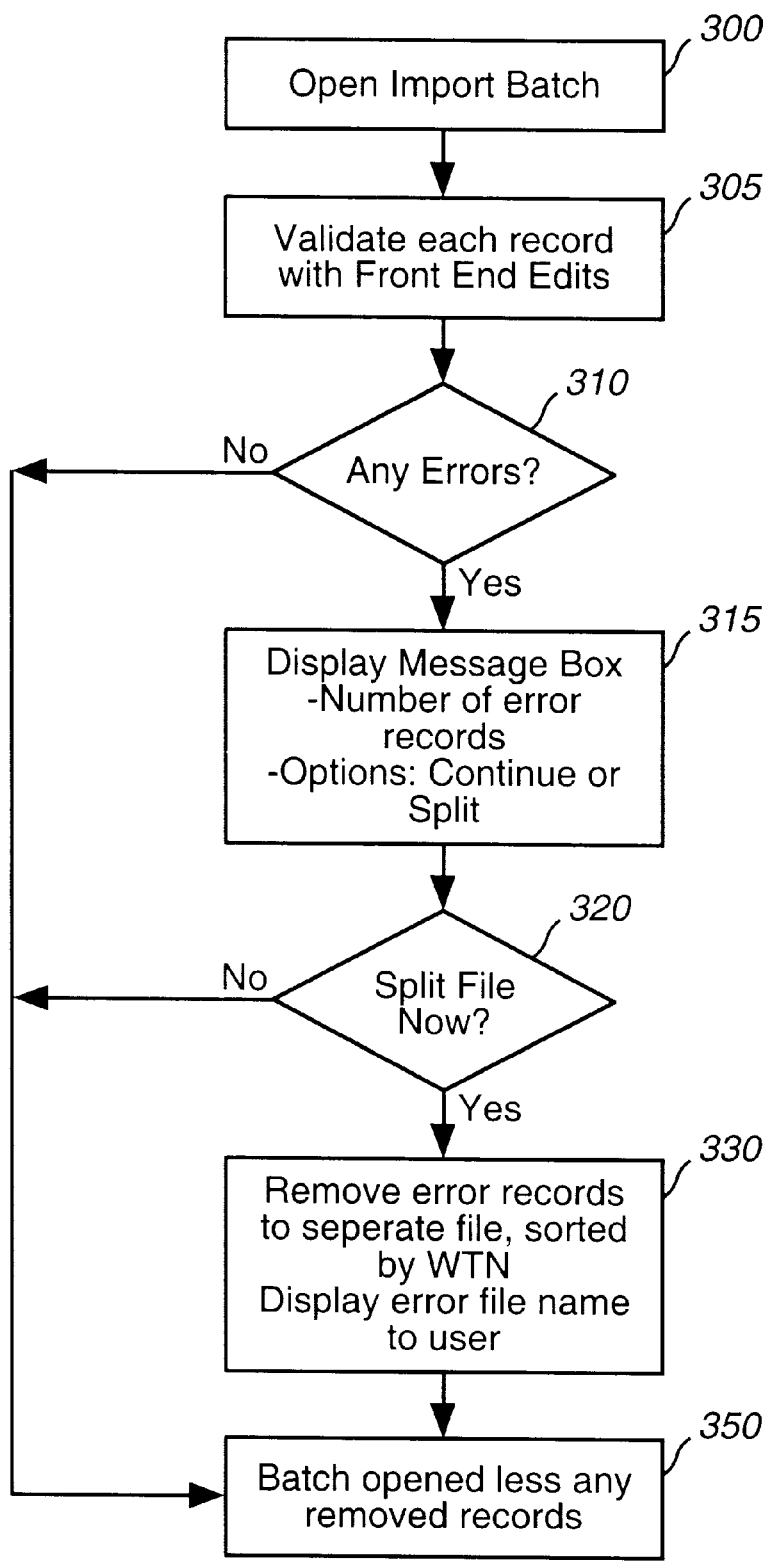
FIG. 6 illustrates the open import batch process flow diagram for imported non-GUI created batches.
Figure 7A:
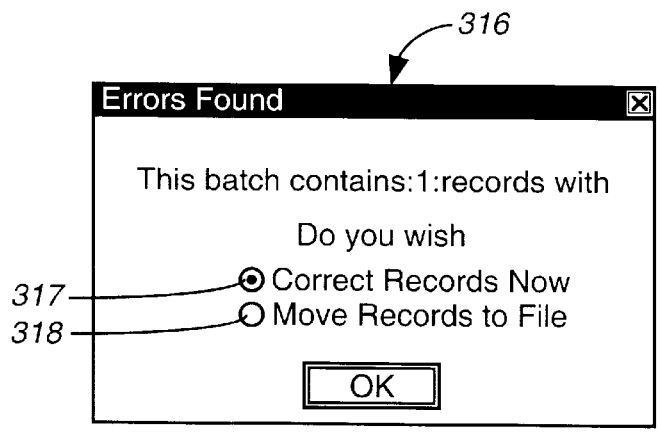
FIG. 7(*a*) illustrates an error dialog box showing options when opening a batch containing order entry records having filed-level errors.
Figure 7B:
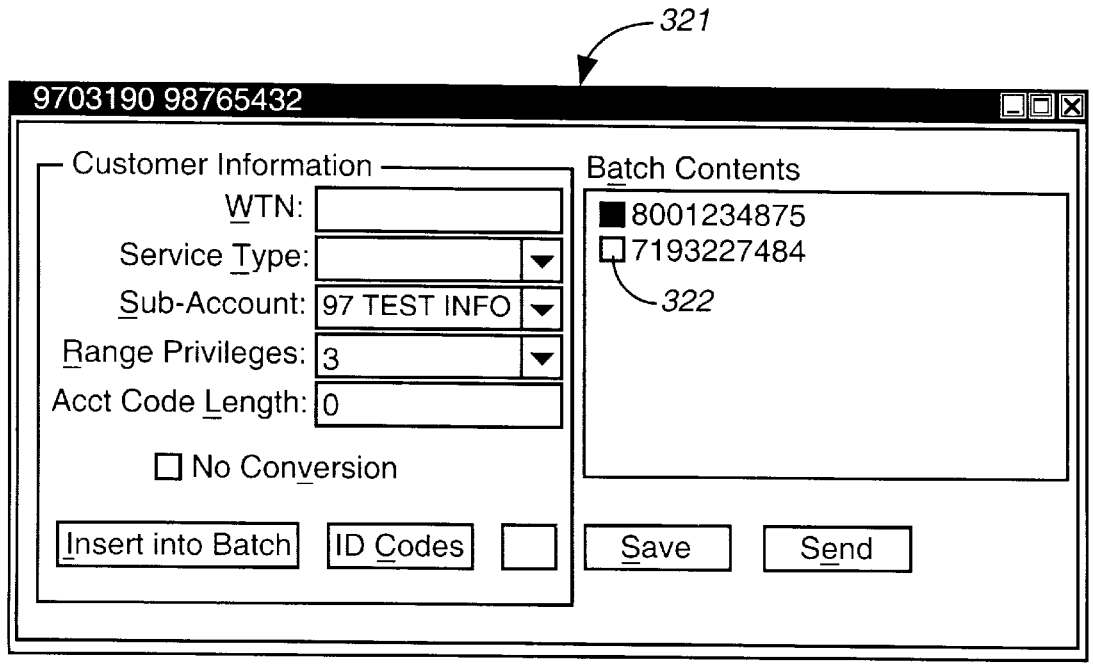

An error processing feature is provided in the GUI 110 to allow errors from an imported batch to be separated into a new file. Thus, when an imported batch contains field-level errors (rejected ANIs), the system presents a choice of how to handle the errors. FIG. 6 illustrates the open import batch process flow diagram when non-GUI created batches are imported. As illustrated in FIG. 6, the first step 300 is to open an import batch by selecting "Open Batch" from the File menu. The GUI then validates each record with the front-end edits at step 305. At step 310, a decision is made as to whether there were any errors in the records present in the batch of orders submitted. If there are no errors found, then the process will return to open the batch at step 350. If there are errors, then as indicated at step 315, a dialog box will appear, such as the box 316 illustrated in FIG. 7(*a*), to provide the user with the number of records containing errors, and further to provide the user with a first option 317 to correct the problems, i.e., edit them, and re-insert them into the batch for submission to the CD Server 130, or, a second option 318 to split the batch and create a new batch containing all of the selected records having errors. If the first option is chosen, a message batch screen 321 will be displayed, such as illustrated in FIG. 7(*b*), which lists the ANIs having errors and a corresponding icon or button 322 to select the ANI record to be corrected. Selection of this button 322 will populate the data fields of the ANI record with the error values to be corrected. Referring back to FIG. 6, if the second option to split the file is selected as shown at step 320, then a new error batch is created at step 330 and given a unique name which is displayed for the user along with an option to run an "Error Report Option" to view the errors. Although the new error batch file may be organized in a plurality of ways, it is preferred that the error batch be sorted on the WTN field, as indicated at step 330. Furthermore, the system 100 provides that the Batch Trailer Record associated with each batch is automatically updated to reflect the correct number of records in the batch.

Although not shown, the system can be provided with further functionality for processing the ANI order batch. For instance, the system may open a previously saved batch error file for editing or processing, and, to enable further corrected records to be split from the error batch and opened as a new batch containing all valid records for submission to the CD Server 130 by selecting a "Split Errors" option from the tools menu of FIG. 4.

Regardless of how batches are created, the process for sending completed (no errors) batches to the system CD Server 130 is the same. Preferably, the file drop down menu of FIG. 4 provides the option to open a pending batch, which when selected, prompts the user to select the correct batch and to initiate a send command which downloads the order entry batch into the CD Server 130. In the preferred embodiment, an FTP protocol is employed to send all batches to the CD Server 130 in a sequential fashion with the server generating a new batch number and date stamp, with or without new ID Codes, for each batch sent.

In addition to supporting ANI order entry, the GUI 110 provides for data queries, report access, and customer user updates via an embedded Internet Explorer (V3.01 or later version) window. Particularly, the system provides a system report interface in the form of web pages that allows the customer to retrieve reports or schedule automated report delivery without requiring intervention. Reports can be received in a report or data file, e.g., ASCII text file, format, by selecting "Download Data file" or "Download Text File" selection links, or, can be viewed on-line. For any report received as a data file, the system assigns a unique header and trailer record to convey Corp ID, report issue date and record count for the report generated.

Specific reports generated depends upon whether the customer is a CNS or RELI customer having a Corp ID. Thus, in the order tracking database 175 (FIG. 17), the following minimum information is retained in the Master data Tables 193 for both CNS and RELI customer viewing or retrieval for each ANI: the WTN/ANI, Conversion indicator, Corporate ID, OCIS Account Number, the Service Type, the Batch Number, the CD Status, the CD Status Description, the CD Status Date, the issue date and the date processed. For RELI customers, the following additional information is retained: the CIC code, the RELI Status, the RELI Status description, the RELI Status Date, the TCSI and the TCSI Date.

The reporting option is provided from the reporting drop-down menu 206 from the screen shown in FIG. 4. Upon selecting the report option, a web page will first display a reporting window (not shown) serving as a means for posting announcements such as recent upgrades, system outages, etc. For Order Service Center representatives, the screen can present options for OSC and Management reports, as well as CNS and RELI reports.

Figure 8A:
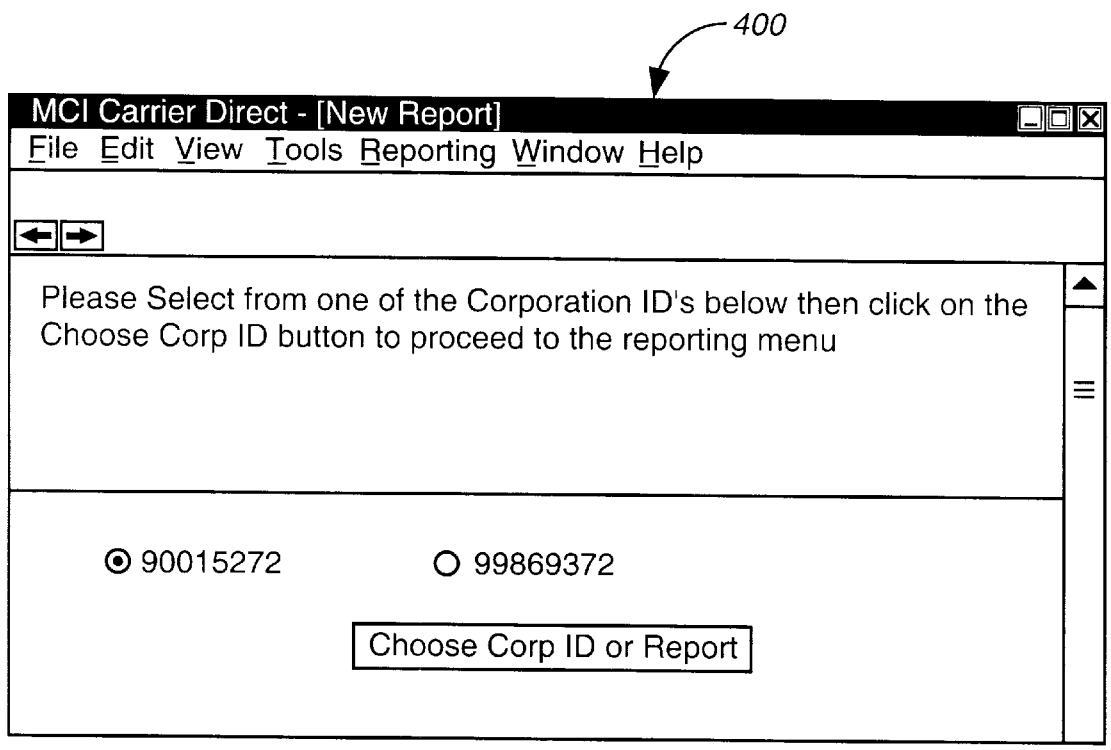
FIG. 8(*a*) illustrates the screen displayed when a customer having more than one Corp ID generates a report.
FIG. 8(d) illustrates the screen displayed for distributing reports via E-mail.
Figure 8B:
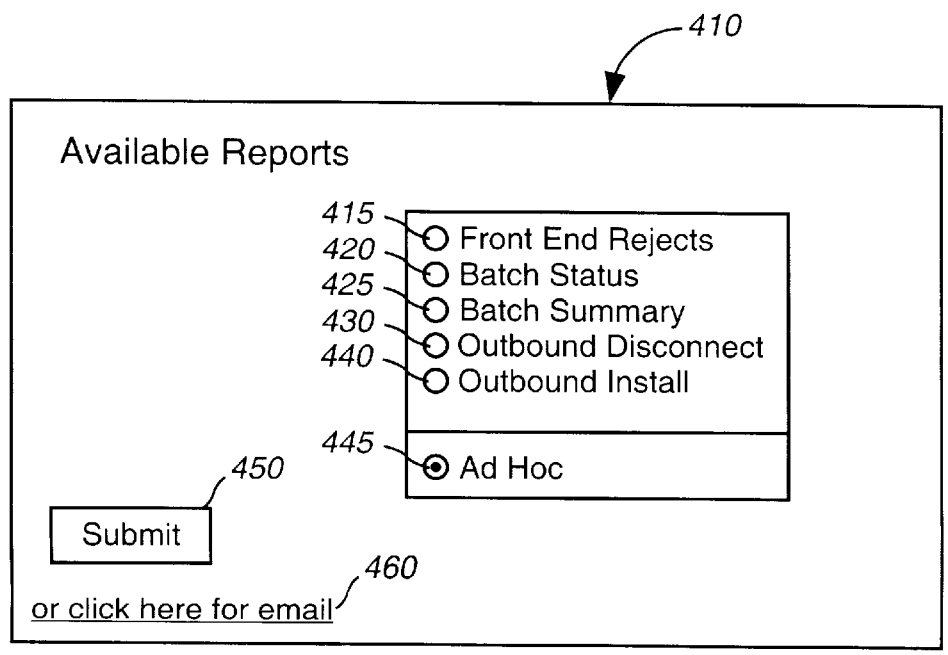

For customers having more than one Corp ID, a dialog screen will be displayed, such as screen 400 shown in FIG. 8(*a*) to enable the customer to choose the particular Corp ID which the report is to be generated for. If the customer has access to only one Corp ID, this screen is bypassed. As shown in the FIG. 8(*b*), screen 410 provides the following check circle selections: if the Corp ID selected is for a CNS customer the reporting options include: Front End Reject Reports 415 detail ANIs which have been front end rejected in the OCIS and can be sorted by batch number and date range; Batch Status Report 420 details the status of all ANIs and can be sorted by a single branch, multiple branches, or a date range; Batch Summary Report 425 summarizes batches by status code for a specific branch, multiple branches, or a specified date range; Outbound Install Report 435 details ANIs which have been installed in OCIS; and Outbound Disconnect Report 430 that details ANIs that have been disconnected in OCIS. If the Corp ID selected indicates a RELI customer, the same reporting options are provided as shown in FIG. 8(*b*) in addition to the following reports: AGED LEC Reject Report (not shown) details ANIs which have been LEC rejected for a specified period of time; and Pending BOC Action report (not shown) details ANIs which have been pending LEC response for a prespecified number of days or more from the date that they were sent to the LEC. After selecting the submit button option 450 in FIG. 8(*b*), a screen will be displayed to show the available dates for the selected report, from the past two weeks worth of days, for example. The most recent date provided can additionally contain an indication that current information is available for that particular day. After selecting the particular date options, the system will generate the requested report and displays the result on the user interface, or, downloads the report as a data file or text file.

In addition to the above reports, ad-hoc queries, as indicated by the check circle selection 445 in FIG. 8(*b*), may be performed to obtain the status of specific ANIs, and for RELI customers, the TCSI File or LEC Status file report may additionally be downloaded. Particularly, FIG. 8(c) illustrates an Ad-hoc report menu 480, which prompts the user to define the criteria used to generate the report. The Ad-Hoc report display screen 480 instructs the CD Server 130 to generate a report based on several types of criteria including Date range, Batch range, status, TCSI or WTN. When the query is submitted, the system will generate and display the requested report, or, alternatively, may be downloaded as a text or data file.

For further functionality, the system 100 can automatically distribute a number of pregenerated reports via e-mail, e.g., for a prespecified period of time, e.g., two weeks. Thus, from the available reports menu of FIG. 8(b), the user can select "Click here for email" link 460, which will provide a dialog screen 475 as shown in FIG. 8(d). As shown in FIG. 8(d), the user can then enter his name and E-mail address and click on the appropriate buttons to indicate which reports the customer desires to receive and when the reports are to be received, e.g., each day.

A detailed description of each of the reports which can be generated by the system and a data record layout of the information contained in each report follows. It should be understood that the format of the report is described in terms of data records, and the printed and ASCII versions of the records will appear different.

As shown in FIG. 12, for CNS customers, the Front End Reject Report 600 details the ANIs that have been front end rejected by the CD system, RELI, or the OCIS. The GUI will provide sort options by batch number and date range. The header record 602 for the Front End Reject Report 600 contains the following fields separated by commas: Header indication 603, Corp ID 604, Issue date 605, and a report name indicator 606 to indicate that the report is a Front End Reject Report. The data record 612 for the report includes the following information fields: GUI assigned Batch Number 614, WTN 616, Issue Date 618, GUI or NOPS Processed Date 620, System status code 622, and OCIS Account number 624. The trailer record 632 will contain a Trailer indication field 634, and Total Record count field 636 indicating the total number of records which will be added to the data file.

As illustrated in FIG. 13, for CNS customers, the Batch Status Report 650, and additionally, the AD-Hoc, Outbound Disconnect, and Outbound Install Reports, all contain the same header record 602 as described with respect to the Front End Reject Report (FIG. 12) except for the report name indicated in field 606, and contain an identical trailer record 632. The data record 660 for these reports includes the following information fields such as the Batch Number 662, WTN 664, Issued Date 666, CD System Status Date 668, CD System Status code 670, CD System Status Description 672 and OCIS Account number 674. For the Outbound Disconnect Report, a filter is implemented on the CD System Status code to report only those ANIs that are disconnected. For the Outbound Install report, a filter is implemented on the CD System Status code to report only those ANIs that are installed/active.

As illustrated in FIG. 14, for CNS customers, the Batch Summary Report 700 provides a summary of the batches by status code for a specific batch, multiple batches, or a specified date range. The header record 702 for this report contains the following fields: Header indication 704, Corp ID value 706, Issue date 708, and a report name indicator 710 to indicate, e.g., that the report is a Batch Summary Report. The data record 712 for this report includes the following information fields: Batch Number 714; Received 716, indicating the total ANIs received on the batch; Pending 718, Pending NOPS Install 720; Active 722; Front End Rejects 724; and Disconnected 726. The trailer record 732 will contain a Trailer indication 734, and Total Record count 736.

For RELI customers, the generated Front End Reject Report (not shown) includes similar formatted header, trailer and data records as for CNS customers (FIG. 12). Likewise, the RELI Batch Status Report/Ad-Hoc Report is similar to the Batch Status report 650 generated for CNS customers (FIG. 13), however, the data record includes the following additional fields: LEC ID, RELI Status Code, RELI Status Date, Transaction Code Status Indicator, and TCSI Date.

For RELI customers, the Outbound Install Report (not shown) is identical to the Outbound Disconnect Report generated for CNS customers, described above, except that the report filters ANIs that are RELI confirmed and CD RELI/NOPS confirmed.

Additionally, for RELI customers, the Aged LEC Reject Report includes a similar header, data and trailer records as the RELI Batch Status report, described above, however, a filter is implemented on the RELI "Reject" Status code and additionally, a filter is implemented for RELI Status dates greater than a predetermined number of days prior to the current date, e.g., five days. For the Pending BOC Action Report generated for RELI customers, the header, data and trailer records are similar to those of the RELI Batch Status report, however, a filter is placed on the RELI "Pending" status and additionally, a filter is implemented for RELI Status dates greater than a predetermined number of days prior to the current date, e.g., eight days.

For RELI customers, the Batch Summary Report includes the same header record as described with respect to the CNS Batch Summary Report FIG. 14) and includes an identical trailer record. The data record for this report however, includes the following additional fields: Pending RELI, LEC Rejects, and Total.

After splitting off rejected ANIs from an imported batch (see FIG. 6), an Error Batch Report may be generated. As shown in FIG. 15, for both CNS and RELI customers, the data record 750 includes information such as the WTN 752, Service Type 754, and Error Reason 756, with associated header and trailer records. The Error Batch Report for the RELI customers will additionally include the BTN (not shown).

In addition to the report generating feature, the Client GUI enables the OSC to define and update Carrier profiles containing, for example, carrier specific information such as CIC code, Corp ID, and OCIS account numbers, and User profiles containing, for example, detailed information about the system user including the user's name, password, type of user, and what CIC codes they have access to. Thus, carriers can be defined as customers with access to only their CIC code. Furthermore, an account manager screen may be displayed containing a list of all of the defined carriers, and providing the ability to add a new carrier, delete an existing carrier or editing information of an existing carrier. When adding a new carrier, the account manager is provided with the ability to enter the carrier name, address and other data, e.g., CIC codes, Corp ID, etc..

Furthermore, on a periodic basis, e.g., monthly, an audit is conducted between the Server, NOPS/OCIS and RELI (for RELI customers) databases, and a database file is generated for each Corp ID based on the audit which generally a snapshot of the customer's entire database. As shown in FIG. 16, the Monthly Database Extract file 800 can be downloaded as a report from the Report Selection window for CNS customers and includes the following data fields: OCIS Account, Corp ID, Batch Number, Service Type, Conversion Indicator, ANI, BTN, Orig ANI, Orig BTN, Range Privilege, CD Status, CD Status Date, and Account Code length, in addition to header and trailer records.

For RELI customers, the monthly database extract report includes the same fields as for CNS customers in addition to the following data fields: Customer name, Address, City, State, Zip Code, Customer Code, Customer Type, Batch ID, LATA Type, LOA Date, Terminal ID, PIC Fee Waiver indicator, RELI Status, RELI Status Date, LEC ID, TCSI Code, and TCSI Date.

Central to the invention is the OCIS messaging system employed for sending input and output messages between the OCIS and CD Server. The abovementioned Inquire ANI Function, Install ANI Function, Deactivate ANI Function, and the Update LATA Indicator Function are characterized as "input" and "output" messages with input messages referring to layouts of data elements that are passed from the Database Server to the mainframe computer where the OCIS application resides. These input messages describe to OCIS what function the front-end is looking to do. Output messages report back to the Server all the front-end results of the requested processing within OCIS.

Specifically, the Inquire ANI Function is initiated by the Server Process to validate the ANIs in OCIS prior to LEC provisioning. The format for this message is depicted in FIG. 18(a) which shows the following fields necessary to successfully validate an ANI in OCIS: a SSN, TABLE_COUNT, TABLE_DATA, TRANSACTION_TYPE, CUSTOMER, ANI, and PIC_IND (A-Intra E-Inter B-Both). Upon receipt of this message, the OCIS application will perform functions for opening the pertinent database files (not shown) in OCIS to retrieve the specified customer data and ANI data, call the CADB for CADB edits, determine if the ANI is in an equal access area, check for secured accounts, perform edits and return all the necessary data including the following: RESPONSE_CODE, SSN, TABLE_COUNT, TABLE_DATA, ERROR_COUNTER, TRANSACTION_TYPE, CUSTOMER, ANI, PIC_IND, CURR_CUSTOMER, BILL_CYCLE, CORP_ID, DIVISION, CUST_STATUS, ANI_STATUS, COMM_RESIDENT, SECURED_ACCT, CELLULAR, EQUAL_ACCESS, FGD AVAIL_DATE, MARKET_STRATEGY, EA DATE, TELCO_NAME, TELCO_NUMBER, ERROR_CODES(array), and ERROR_CODES.

The Install ANI Function is initiated by the Server Process to install ANIs or add Inter/Intra Lata service to an active ANI in OCIS and can process up to fifty (50) ANIs per customer. For Installs, the ANIs may be installed with INTERLATA service, INTRALATA service, or both; depending on CADB. The Server will generate an input message for the OCIS as depicted in FIG. 18(b) which illustrates the following information required to successfully install an ANI in OCIS: OCIS_CUST ID (Customer OCIS Account Number), OPER_SSN (Social Security number of person submitting batch to Carrier Direct), ANI_CTR (number of phone numbers in table), ANI_INFO(array of phone numbers), PHONE_NBR (phone number), DIALIND, MEGA_DIAL_SOURCE, LOA_DT (letter of authorization date), LOA_IND (letter of authorization indicator), BOC_STATUS (Bell operating company status (has the number been PIC'd to this customer), BOC_DT (Date of the PIC), TAX_EXEMPT_CD (Code if the customer is tax-exempt from state, federal or both), PREMISE_OWNER, ACCT_CODE, RATE_CODE, SUBTTL_IND, SUB56_IND, DEPT_NBR, and PIC_ENV_FLAG. OCIS will receive this message, edit the input data, process the order (install the ANIS or reject them), update the necessary database files, and send back a response to the Carrier Direct Server which will indicate the status of the order and includes the following: RETURN_CD, OCIS_CUST_ID, SYS_ERROR_CTR, ANI_ERROR_CTR, ANI_SYS_ERROR_TABLE(array of errors that occurred in the OCIS system during processing), SYS_ERROR_CD, ANI_ERROR_TABLE (array of errors that are specific to an ANI), PHONE_NBR, DUP_CUST_NBR, and ERROR_CD_GRP. When adding a service (INTER or INTRA) to an active ANI, the same input message will be used. If the ANI is active on the same OCIS account which is indicated on the input message, and the service indicated by the LATA indicator is NOT already active on that ANI, the corresponding service will be activated on the ANI. If the LATA indicator is "B", and the ANI is already active, or the LATA indicator is 'A' or 'E', and the corresponding service is already active, the install order will be rejected.

The response area of the ADD ANI message includes two error tables: 1) the system error table including a number of errors; and 2) the ANI error table including at least one error per ANI on the original install message. These errors are ANI specific and do not affect the processing of the other ANIs on the install message. The ANI error table will also contain the OCIS account number of any duplicate ANIs found during the install.

In accordance with the description herein, customers can use the GUI to transmit batches of ANIs to the CD Server for deactivation, with the attendant updating in the tracking database. RELI customer ANIs to be deactivated are received with the RELI daily LEC Status File and can only be received by LEC.

The "Deactivate ANI" Function is initiated by the CD Server process to deactivate ANIs or deactivate the INTER or INTRA Lata service on an ANI in OCIS. This message will process up to 50 ANIs per customer. If the Lata indicator on the input message is 'B' or blank, this message will deactive the entire ANI which includes INTER and INTRA Lata services. If the Lata indicator is 'A' or 'E', and the corresponding service is already deactive on the ANI, the order will be rejected. The Server will generate an input message for the OCIS as depicted in FIG. 18(c) which illustrates the following information required to successfully deactivate an ANI in OCIS: OPER_SSN, CUST_NBR, CTR, ANI_INFO (array), PHONE_NBR, STATUS_CODE and PIC_IND. OCIS will receive this message, edit the input data, process the order (deactivate the ANIs or reject them), update the necessary database files, and send back a response to the Carrier Direct Server which will indicate the status of the order and includes the following: RESPONSE_CODE, OCIS_CUST_ID, SYS_ERROR_CTR, ANI_ERROR_CTR, SYS_ERRORS, DETAIL_INFO(array), CUST_NBR, PHONE_NBR and ERROR_CD_GRP.

The response area of the DEACTIVATE ANI message contains two error tables: 1) the system error table including a number of errors; and 2) the ANI error table including at least one error per ANI on the original deactivate message. These errors are ANI specific and do not affect the processing of the other ANIs on the DEACTIVATE message.

The foregoing merely illustrates the principles of the present invention. Those skilled in the art will be able to devise various modifications, which although not explicitly described or shown herein, embody the principles of the invention and are thus within its spirit and scope.

What is claimed is:

1. An automated order processing system for a telecommunications services carrier that is capable of activating customer orders and provisioning telecommunications services via a local exchange entity, said system comprising:

means for receiving one or more customer orders from a remote location, each said customer order having at least one unique identifier, said receiving means validating a format of each of said one or more customer orders received;

means for providing front-end editing of said customer orders to validate format of said customer orders;

a database means for containing validated customer order information; and processing means for entering said validated customer orders into said database means prior to said customer order activation and provisioning, and for receiving updated status information of successfully activated customer orders, wherein means for receiving said customer orders includes graphical user interface means in communication with said processing means for enabling direst input of data records containing plurality of customer orders;

wherein said processing means updates the status of each activated customer order in said database means.

2. The automated system as claimed in claim 1, wherein customer orders are imported as a batch file for input to said graphical user interface means.

3. The automated system of claim 1, wherein said unique identifier unique to said customer order includes an automatic number identifier corresponding to a working telephone number.

4. The automated system as claimed in claim 1, wherein said one or more customer orders are entered by a representative entity providing services for customers.

5. The automated system as claimed in claim 1, wherein a said customer order comprising a data record having said at least one unique identifier corresponding to said customer order in addition to other informational data, said identifier and informational data being provided in said record in a predefined format, said means for receiving said orders providing real-time editing function to ensure that said record is in a correct format.

6. The automated system as claimed in claim 5, wherein said means for receiving further generates an error batch file containing those customer orders that have been incorrectly formatted.

7. The automated system as claimed in claim 1, wherein said system is organized as a client-server architecture having a client application including said graphical user interface means for receiving and validating said customer entered orders, and a server application including said processing means for processing said customer orders.

8. The automated system as claimed in claim 7, wherein said client application processes said received customer orders and formats them as a file suitable for automatic downloading into said server application.

9. The automated system as claimed in claim 7, wherein said graphical user interface means and said client application communicate via a transport media supporting TCP/IP communications protocol with said processing means.

10. The automated system as claimed in claim 9, wherein said transport media is one of an analog or digital communication system.

11. The automated system as claimed in claim 1, wherein said customer orders are submitted by a representative entity of telecommunications services, said system further including means for determining whether said telecommunications service carrier is to provision said customer orders via said local exchange carrier entity.

12. The automated system as claimed in claim 11, wherein said processing means includes first validating means for further validating the content of said unique identifier contained in said customer order, and receiving corresponding validation that said unique identifier is valid.

13. The automated system as claimed in claim 12, wherein said first validating means includes means for comparing said customer orders against predefined tables containing valid unique identifier information contained in a calling area database.

14. The automated system as claimed in claim 12, further including a means for providing real-time access to information relating to customers of said representative entity having orders to be provisioned through said local exchange carrier entity, said processing means further including second validating means for further validating the content of said unique identifier contained in said customer order against those customer orders to be provisioned, and receiving corresponding validation that said customer order will successfully install at said local exchange carrier entity.

15. The automated system as claimed in claim 14, wherein said processing means converts said customer order information that have been successfully validated by said first validating means and said second validating means into a format suitable for provisioning at said local exchange carrier entity.

16. The automated system as claimed in claim 15, further including an interface means for routing said converted customer order information from said processing means to a corresponding local exchange carrier entity, said interface means further receiving confirmation from said local exchange carrier entity that a customer order has been successfully activated.

17. The automated system as claimed in claim 16, wherein said interface means further includes means for generating a status report of activated customer orders for downloading to said processing means.

18. The automated system as claimed in claim 1, wherein said processing means includes means for generating reports containing updated status information of customer orders, said system enabling representative entity access to said customer reports through said graphical user interface.

19. The automated system as claimed in claim 14, wherein said representative entity is capable of provisioning telecommunications services for said customer, said means for providing real-time access to information relating to customers of said representative entity further including means for directly activating customer orders received from said processing means.

20. The automated system as claimed in claim 1, further including means for deactivating prior activated unique identification data.

21. The automated system as claimed in claim 1, wherein said receiving means includes means for enabling said customer order to provide real-time correction of those orders that could not be validated through said graphical user interface means.

22. The automated system as claimed in claim 6, further including means for storing said error batch file for subsequent correction.

23. An automated order processing and report generating system for an inter-exchange carrier providing telecommunications services for a representative entity and customers thereof, said system comprising:

graphical user interface means for enabling batch order entry of customer orders by said representative entity;

means for providing front-end editing of said customer orders to validate format of said customer orders;

processing means in communication with said graphical user interface means for initiating activation, installation and provisioning of services corresponding to a unique customer identifier associated with each customer order, said provisiorung of services being performed for said representative entity via an on-line customer information system through a local exchange carrier, said processing means further comprising:

(i) means for automatically generating customer records corresponding to received, front-end validated customer orders for entry into a database memory prior to activation, each said record including said unique customer identifier and a status indicator;

(ii) means for receiving confirmation of successfull customer order installations, from one of said local exchange carrier and said on-line customer information system; and (iii) means for updating the status indicator of each activated customer order in said database memory; whereby the status of all customer orders is tracked through the entry, order activation, installation and provisioning processes and provided for real-time reporting purposes via said graphical user interface means.

24. The automated order processing and reporting generating system means as claimed in claim 23, wherein said activation, installation and provisioning of services corresponding to said unique customer identifier is performed via said inter-exchange carrier, said processing means further including:

first validating means for further validating the content of said unique customer identifier contained in said customer order, and receiving corresponding validation that said unique identifier is valid; and second validating means for further validating the content of said unique identifier contained in said customer order against records of those customer orders contained in said on-line customer information system, and receiving corresponding validation that said customer order will successfully install at said local exchange carrier.

25. The automated order processing and report generating system as claimed in claim 24, wherein said first validating means includes means for comparing said customer orders against predefined tables containing valid unique customer identifier information contained in a calling area database.

26. The automated order processing and report generating system as claimed in claim 23, wherein said processing means converts said customer order information that have been successfully validated by said first validating means and said second validating means into a format suitable for provisioning at said local exchange carrier entity.

27. The automated order processing and report generating system as claimed in claim 23, wherein said an on-line customer information system further includes means for directly activating and installing unique customer identifiers of orders received from said processing means.

28. A method of processing orders for customers of a telecommunications service entity capable of activating customer orders and provisioning telecommunications services via a local exchange carrier entity, said method comprising the steps of:

receiving customer orders containing identifying data and information data associated with each of said customer orders via a client application;

validating the format of each customer order received by front-end editing said customer order, said customer order comprising a data record having at least one unique identifier corresponding to said customer order in addition to other informational data, said identifier and information data being provided in said record in a predefined format, wherein validating said customer order includes real-time editing to ensure said data record is in a correct format;

automatically communicating new customer orders to a server application, said server storing validated new orders in a database memory;

activating said valid customer orders by provisioning telecommunications services for said customers through a local exchange carrier entity;

receiving updated status information of successfully activated customer orders; and updating the status of each activated customer order in said database memory.

29. The method according to claim 28, further comprises the step of entering a batch of customer orders in a predefined format through a graphical user interface prior to receivinig said customer orders, said graphical user interface located remotely from said telecommunications service entity.

30. The method according to claim 28, further comprises the step of importing a batch file containing said customer orders for input to a graphical user interface means prior to receiving said customer orders.

31. The method as claimed in claim 28, wherein said step of validating the format of each customer order received includes generating an error batch file containing those customer orders that have been incorrectly formatted.

32. The method as claimed in claim 31, further including the step of providing on-line correction of customer orders that have been incorrectly formatted.

33. The method as claimed in claim 31, further including the step of storing said error batch file for subsequent correction.

34. The method as claimed in claim 28, wherein said customer orders are submitted by a representative entity of telecommunications services, said method further including the step of determining whether said telecommunications service entity is to provision said customer orders via said local exchange carrier entity.

35. The method as claimed in claim 34, wherein said activating step includes the steps of:

validating content of said unique identifier contained in said customer order, and receiving corresponding validation that said unique identifier is valid.

36. The method as claimed in claim 35, wherein said validating content step includes the step of comparing said customer orders against predefined tables containing valid unique identifier information contained in a calling area database.

37. The method as claimed in claim 35, wherein an on-line customer information system provides real-time access to information relating to customers of said representative entity having orders to be provisioned through said local exchange carrier entity, said activating step further including the steps of:

validating the content of said unique identifier contained in said customer order against those customer orders to be provisioned, and receiving corresponding validation that said customer order will successfully install at said local exchange carrier entity.

38. The method as claimed in claim 37, wherein said activating step further includes the steps of: converting said customer order information that have been successfully validated into a format suitable for provisioning at said local exchange carrier entity.

39. The method as claimed in claim 38, wherein said provisioning step further includes the steps of:

routing converted customer order information to a said local exchange carrier entity; and receiving confirmation from said local exchange carrier entity that a customer order has been successfully activated.

40. The method as claimed in claim 39, further including the step of generating a status report of activated customer orders prior to said updating step.

41. The method as claimed in claim 28, further including the steps of:

generating reports containing updated status information of customer orders, and enabling representative entity access to said customer reports in real-time through a graphical user interface.

42. The method as claimed in claim 34, wherein an on-line customer information system provides real-time access to information relating to customers of said representative entity that is to provision customer orders via said local exchange carrier entity, said activating step further including the steps of:

directly activating customer orders received from a processing means at said on-line customer information system; and receiving confirmation of customer order activation.

43. The method as claimed in claim 28, further including the step of deactivating unique identification data associated with prior activated customer orders.

* * * * *